US009720837B2

(12) United States Patent
Bradbury et al.

(10) Patent No.: US 9,720,837 B2
(45) Date of Patent: Aug. 1, 2017

(54) ALLOWING NON-CACHEABLE LOADS WITHIN A TRANSACTION

(71) Applicant: International Business Machines Corporation, Armonk, NY (US)

(72) Inventors: Jonathan D. Bradbury, Poughkeepsie, NY (US); Michael Karl Gschwind, Chappaqua, NY (US); Valentina Salapura, Chappaqua, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 14/317,382

(22) Filed: Jun. 27, 2014

(65) Prior Publication Data

US 2015/0378927 A1 Dec. 31, 2015

(51) Int. Cl.
| | |
|---|---|
| *G06F 12/08* | (2016.01) |
| *G06F 9/46* | (2006.01) |
| *G06F 9/52* | (2006.01) |
| *G06F 12/0837* | (2016.01) |

(Continued)

(52) U.S. Cl.
CPC .......... *G06F 12/0837* (2013.01); *G06F 9/467* (2013.01); *G06F 9/528* (2013.01);
(Continued)

(58) Field of Classification Search
CPC ....... G06F 9/467; G06F 9/528; G06F 12/0837
See application file for complete search history.

(56) References Cited

U.S. PATENT DOCUMENTS

| 5,586,297 A | 12/1996 | Bryg et al. |
| 5,664,148 A | 9/1997 | Mulla et al. |

(Continued)

FOREIGN PATENT DOCUMENTS

WO 2013016186 A2 1/2013

OTHER PUBLICATIONS

U.S. Appl. No. 14/317,394, filed Jun. 27, 2014, entitled "Detecting Cache Conflicts by Utilizing Logical Address Comparisons in a Transactional Memory".

(Continued)

*Primary Examiner* — Ann J Lo
*Assistant Examiner* — Masud Khan
(74) *Attorney, Agent, or Firm* — Michael A. Petrocelli

(57) ABSTRACT

A computer allows non-cacheable loads or stores in a hardware transactional memory environment. Transactional loads or stores, by a processor, are monitored in a cache for TX conflicts. The processor accepts a request to execute a transactional execution (TX) transaction. Based on processor execution of a cacheable load or store instruction for loading or storing first memory data of the transaction, the computer can perform a cache miss operation on the cache. Based on processor execution of a non-cacheable load instruction for loading second memory data of the transaction, the computer can not-perform the cache miss operation on the cache based on a cache line associated with the second memory data being not-cached, and load an address of the second memory data into a non-cache-monitor. The TX transaction can be aborted based on the non-cache monitor detecting a memory conflict from another processor.

14 Claims, 9 Drawing Sheets

(51) Int. Cl.
*G06F 12/0817* (2016.01)
*G06F 12/0811* (2016.01)
*G06F 12/0891* (2016.01)

(52) U.S. Cl.
CPC ...... *G06F 12/0811* (2013.01); *G06F 12/0828* (2013.01); *G06F 12/0891* (2013.01); *G06F 2212/1021* (2013.01); *G06F 2212/1041* (2013.01); *G06F 2212/283* (2013.01); *G06F 2212/621* (2013.01); *G06F 2212/622* (2013.01)

(56) References Cited

U.S. PATENT DOCUMENTS

| | | | |
|---|---|---|---|
| 5,802,572 | A | 9/1998 | Patel et al. |
| 5,845,327 | A | 12/1998 | Rickard et al. |
| 6,321,302 | B1 | 11/2001 | Strongin et al. |
| 6,349,361 | B1 | 2/2002 | Altman et al. |
| 7,269,694 | B2 | 9/2007 | Tremblay et al. |
| 7,389,383 | B2 | 6/2008 | Tremblay et al. |
| 7,395,382 | B1 | 7/2008 | Moir |
| 7,496,716 | B2 | 2/2009 | Dice et al. |
| 7,676,636 | B2 | 3/2010 | Cypher et al. |
| 7,810,085 | B2 | 10/2010 | Shinnar et al. |
| 7,890,725 | B2 | 2/2011 | von Praun et al. |
| 7,917,698 | B2 | 3/2011 | Cypher et al. |
| 8,074,030 | B1 | 12/2011 | Moir et al. |
| 8,195,898 | B2 | 6/2012 | Welc et al. |
| 8,209,499 | B2 | 6/2012 | Chou |
| 8,301,849 | B2 | 10/2012 | Rajwar et al. |
| 8,352,712 | B2 | 1/2013 | Bell, Jr. et al. |
| 8,364,909 | B2 | 1/2013 | Chakrabarti |
| 9,128,750 | B1 * | 9/2015 | August ............ G06F 9/467 712/225 |
| 2004/0044850 | A1 | 3/2004 | George et al. |
| 2007/0245099 | A1 | 10/2007 | Gray et al. |
| 2008/0005737 | A1 | 1/2008 | Saha et al. |
| 2008/0270745 | A1 | 10/2008 | Saha et al. |
| 2009/0006767 | A1 | 1/2009 | Saha et al. |
| 2009/0019231 | A1 * | 1/2009 | Cypher ............ G06F 12/08 711/141 |
| 2009/0172286 | A1 * | 7/2009 | Lasser ............ G06F 12/0804 711/127 |
| 2009/0172305 | A1 | 7/2009 | Shpeisman et al. |
| 2009/0172317 | A1 | 7/2009 | Saha et al. |
| 2009/0276578 | A1 * | 11/2009 | Moyer ............ G06F 12/0831 711/141 |
| 2009/0287885 | A1 * | 11/2009 | Kriegel ............ G06F 9/3824 711/143 |
| 2010/0058344 | A1 | 3/2010 | Ni et al. |
| 2010/0169623 | A1 | 7/2010 | Dice |
| 2011/0145512 | A1 | 6/2011 | Adl-Tabatabai et al. |
| 2011/0145553 | A1 | 6/2011 | Levanoni et al. |
| 2011/0246725 | A1 | 10/2011 | Moir et al. |
| 2012/0079204 | A1 | 3/2012 | Chachad et al. |
| 2012/0144126 | A1 | 6/2012 | Nimmala et al. |
| 2012/0159461 | A1 | 6/2012 | Nakaike |
| 2012/0174083 | A1 | 7/2012 | Shpeisman et al. |
| 2012/0233411 | A1 | 9/2012 | Pohlack et al. |
| 2012/0297152 | A1 | 11/2012 | Saha et al. |
| 2012/0311246 | A1 | 12/2012 | McWilliams et al. |
| 2012/0324447 | A1 | 12/2012 | Huetter et al. |
| 2014/0095851 | A1 * | 4/2014 | Gerwig ............ G06F 9/4812 712/244 |
| 2015/0242334 | A1 * | 8/2015 | Higham ............ G06F 12/1433 711/163 |
| 2015/0277967 | A1 * | 10/2015 | Calciu ............ G06F 9/467 711/147 |

OTHER PUBLICATIONS

U.S. Appl. No. 14/317,371, filed Jun. 27, 2014, entitled: "Accurate Tracking of Transactional Read and Write Sets With Speculation".
U.S. Appl. No. 14/317,417, filed Jun. 27, 2014, entitled: "Improving Memory Performance When Speculation Control is Enabled, and Instruction Therefor".
U.S. Appl. No. 14/317,463, filed Jun. 27, 2014, entitled: "Speculation Control for Improving Transaction Success Rate, and Instruction Therefor".
U.S. Appl. No. 14/317,370, filed Jun. 27, 2014, entitled: "Managing Read Tags in a Transactional Memory".
U.S. Appl. No. 14/317,391, filed Jun. 27, 2014, entitled: "Conditional Inclusion of Data in a Transactional Memory Read Set".
U.S. Appl. No. 14/317,422, filed Jun. 27, 2014, entitled: "Co-Processor Memory Accesses in a Transactional Memory".
U.S. Appl. No. 14/317,444, filed Jun. 27, 2014, entitled: "Co-Processor Memory Accesses in a Transactional Memory".
U.S. Appl. No. 14/317,376, filed Jun. 27, 2014, entitled: "Transactional Execution in a Multi-Processor Environment That Monitors Memory Conflicts in a Shared Cache".
U.S. Appl. No. 14/317,415, filed Jun. 27, 2014, entitled: "Transactional Execution Processor Having a Co-Processor Accelerator, Both Sharing a Higher Level Cache".
U.S. Appl. No. 14/317,446, filed Jun. 27, 2014, entitled: "Allocating Read Blocks to a Thread in a Transaction Using User Specified Logical Addresses".
IBM: List of IBM Patents or Patent Applications Treated As Related (Appendix P), Aug. 11, 2015, pp. 1-2.
U.S. Appl. No. 14/848,386, filed Sep. 9, 2015, entitled: "Allowing Non-Cacheable Loads Within a Transaction", pp. 1-81.
Del Barrio, "Optimizing Signatures in Hardware Transactional Memory Systems", Doctoral Thesis for Doctor of Philosophy, Department of Computer Science, University of Malaga, Oct. 2012.
Moravan et al., "Supporting Nested Transactional Memory in LogTM"; Twelfth International Conference on Architectural Support for Programming Languages and Operating Systems, University of Wisconsin; 2006, pp. 1-41.
Berke et al., "A Cache Technique for Synchronization Variables in Highly Parallel, Shared Memory Systems", Original Publication Date: Dec. 31, 1988, An IP.com Prior Art Database Technical Disclosure, IP.com No. IPCOM000128199D, IP.com Electronic Publication: Sep. 15, 2005.
Proceedings 2012 IEEE/ACM 45th International Symposium on Microarchitecture MICRO-45, presented Dec. 1-5, 2012, "Transactional Memory Architecture and Implementation for IBM System z", pp. 25-36.
IBM, "Principles of Operation", Tenth Edition (Sep. 2012), SA22-7832-09.
"Intel® Architecture Instruction Set Extensions Programming Reference", 319433-012A, Feb. 2012.
McDonald, "Architectures for Transactional Memory", A Dissertation Submitted to the Department of Computer Science and the Committee on Graduate Studies of Stanford University in Partial Fulfillment of the Requirements for the Degree of Doctor of Philosophy, Jun. 2009, pp. 1-145.
Mak et al., IBM J. Res. & Dev. vol. 53, No. 1, Paper 2, 2009, "IBM System z10 Processor Cache Subsystem Microarchitecture", pp. 2:1-2:12.
IBM, "DB Write Accelerator", An IP.com Prior Art Database Technical Disclosure, Original Publication Date: Oct. 24, 2007, IP.com No. IPCOM000159668D, IP.com Electronic Publication: Oct. 24, 2007.
Marandola et al., "Enhancing Cache Coherent Architectures with Access Patterns for Embedded Manycore Systems", AN-13172273, 2012.
Morad et al., "Generalized MultiAmdahl: Optimization of Heterogeneous Multi-Accelerator SoC", CCIT Report #812, Sep. 2012.
Suh et al., "Soft Error Benchmarking of L2 Caches with PARMA", SIGMETRICS'11, Jun. 7-11, 2011, San Jose, California, USA, Copyright 2011, ACM.
Disclosed Anonymously, "File Service Definition Language", An IP.com Prior Art Database Technical Disclosure, IP.com No. IPCOM000212123D, IP.com Electronic Publication: Oct. 31, 2011.
Minh et al., "An Effective Hybrid Transactional Memory System with Strong Isolation Guarantees", ISCA '07, Jun. 9-13, 2007, Copyright 2007, ACM.

(56) References Cited

OTHER PUBLICATIONS

Saha et al, "Architectural Support for Software Transactional Memory", The 39th Annual IEEE/ACM International Symposium on Microarchitecture (MICRO '06), 2006 IEEE.
Casper et al. "Hardware Acceleration of Transactional Memory on Commodity Systems". ASPOLS'11, Mar. 5-11, 2011, Copyright 2011, ACM.
Blake et al., "Bloom Filter Guided Transaction Scheduling", 2011.
Monash, "Memory-Centric Data Management", Monash Information Services, Version 1.01, May 2006, © Monash Information Services, 2006.
Shriraman et al., "Implementation tradeoffs in the design of flexible transactional memory support", *This work was supported in part by NSF grants CCF-0702505, CCR-0204344, CNS-0411127, CNS-0615139, CNS-0834451, and CNS-0509270; NIH grants 5 R21 GM079259-02 and 1 R21 HG004648-01; an IBM Faculty Partnership Award; equipment support from Sun Microsystems Laboratories; and financial support from Intel and Microsoft, Journal of Parallel and Distributed Computing, vol. 70, Issue 10, Oct. 2010, pp. 1068-1084, © 2010.
Zyulkyarov et al., Transaction Processing Core for Accelerating Software Transactional Memory, Barcelona Supercomputing Center, Barcelona Spain, Microsoft Research Cambridge UK, Departament d'Arquitectura de Computadors Technical Report UPCDACRRGEN20075, Aug. 2007, <https://www.ac.upc.edu/app/research-reports/html/2007/44/>.

* cited by examiner

ALLOWING NON-CACHEABLE LOADS WITHIN A TRANSACTION

BACKGROUND

The present disclosure relates generally to a computer implemented method and system for allowing non-cacheable loads in a hardware transactional memory environment. The number of central processing unit (CPU) cores on a chip and the number of CPU cores connected to a shared memory continues to grow significantly to support growing workload capacity demand. The increasing number of CPUs cooperating to process the same workloads puts a significant burden on software scalability; for example, shared queues or data-structures protected by traditional semaphores become hot spots and lead to sub-linear n-way scaling curves. Traditionally this has been countered by implementing finer-grained locking in software, and with lower latency/higher bandwidth interconnects in hardware. Implementing fine-grained locking to improve software scalability can be very complicated and error-prone, and at today's CPU frequencies, the latencies of hardware interconnects are limited by the physical dimension of the chips and systems, and by the speed of light.

Implementations of hardware transactional memory (HTM, or in this discussion, simply TM) have been introduced, wherein a group of instructions—called a transaction—operate in an atomic manner on a data structure in memory, as viewed by other central processing units (CPUs) and the I/O subsystem (atomic operation is also known as block concurrent or serialized in other literature). The transaction executes optimistically without obtaining a lock, but may need to abort and retry the transaction execution if an operation, of the executing transaction, on a memory location conflicts with anther operation on the same memory location. Previously, software transactional memory implementations have been proposed to support software Transactional Memory (STM). However, hardware TM can provide improved performance aspects and ease of use over software TM.

U.S. Pat. No. 6,321,302 titled "Stream read buffer for efficient interface with block oriented devices", filed Apr. 15, 1998, and incorporated by reference, teaches a system for improving the efficiency of data transactions to a non-cacheable address, or to a block-accessed device. A stream read buffer and associated logic is used to temporarily store the non-cacheable data, or to store large blocks of data from a block-accessed device. The stream read buffer loads the data upon the occurrence of certain predefined events, as determined by the associated state logic. Similarly, the stream read buffer flushes its contents when the stored data is not being accessed, or after the expiration of a particular time frame.

U.S. Pat. No. 7,676,636 titled "Method and apparatus for implementing virtual transactional memory using cache line marking", filed Jul. 10, 2007, and incorporated by reference, teaches embodiments which implement virtual transactional memory using cache line marking. The system starts by executing a starvation-avoiding transaction for a thread. While executing the starvation-avoiding transaction, the system places starvation-avoiding load-marks on cache lines which are loaded from and places starvation-avoiding store-marks on cache lines which are stored to. Next, while swapping a page out of a memory and to a disk during the starvation-avoiding transaction, the system determines if one or more cache lines in the page have a starvation-avoiding load-mark or a starvation-avoiding store-mark. If so, upon swapping the page into the memory from the disk, the system places a starvation-avoiding load-mark on each cache line that had a starvation-avoiding load-mark and places a starvation-avoiding store-mark on each cache line that had a starvation-avoiding store-mark.

BRIEF SUMMARY

When in the transactional execution mode of execution, a CPU may not be able to issue a non-transactional load instruction. This can be caused by the cache subsystem being responsible for tracking memory references and when memory locations have changed. Whenever an instruction that requests data from memory while specifying that the data should not be cached was encountered in a transaction that instruction would cause the transaction to abort due to it being a restricted instruction. Instructions that instruct data to not be cached must be restricted because they would bypass the cache and not be able to be tracked as part of the transaction working set. One solution to this problem is to have a separate tracking mechanism that runs in parallel with the cache directory tracking mechanism. This separate tracking mechanism stores the addresses of data loaded with non-cacheable load instructions. When a protocol request comes in from another CPU both the cache directory and the non-cacheable load tracker are queried to see if they contain the address of the protocol request. If either contains the address of the protocol request then the transaction is aborted.

In one aspect according to the disclosure, a method is implemented on a computer for allowing non-cacheable loads in a hardware transactional memory environment. The computer comprises a processor in communication with a memory, wherein transactional loads or stores by the processor are monitored for transactional execution (TX) conflicts in a cache of the hierarchical cache subsystem. The method includes accepting a request, by the processor, to execute a TX transaction. Based on execution, by the processor, of a non-cacheable load instruction for loading second memory data of the transaction, an address of the second memory data is loaded into a non-cache-monitor for monitoring memory conflicts of non-cached lines. The non-cache monitor is for monitoring memory conflicts of non-cached lines. The TX transaction can be aborted based on the non-cache monitor detecting a memory conflict from another processor. The memory conflict comprises requesting an access, by the other processor, to the address monitored by the non-cache monitor.

In another aspect according to the disclosure, a computer program product allows non-cacheable loads in a hardware transactional memory environment. Transactional loads by a processor are monitored for transactional execution (TX) conflicts in a cache of a hierarchical cache subsystem. The computer program product comprising a computer readable storage medium readable by a processing circuit and storing instructions for execution by the processing circuit for performing a method comprising: accepting a request, by the processor, to execute a transactional execution (TX) transaction; based on execution, by the processor, of a cacheable load or store instruction for loading or storing first memory data of the transaction, performing a cache miss operation on the cache based on a cache line associated with the first memory data not being cached in the cache; based on execution, by the processor, of a non-cacheable load instruction for loading second memory data of the transaction, loading an address of the second memory data into a non-cache-monitor for monitoring memory conflicts of non-cached lines without performing a cache miss operation on the cache based on a cache line associated with the second memory data not being cached; and aborting the TX transaction based on the non-cache monitor detecting a memory conflict from another processor, the memory conflict comprising requesting an access, by the other processor, to the address monitored by the non-cache monitor.

In another aspect according to the disclosure, a computer system allows non-cacheable loads in a hardware transactional memory environment. The computer system includes a memory, and a processor in communications with the memory by way of a hierarchical cache subsystem. Transactional loads or stores by the processor are monitored for transactional execution (TX) conflicts in a cache of the hierarchical cache subsystem. The computer system is configured to perform a method, comprising: accepting a request, by the processor, to execute a TX transaction; based on execution, by the processor, of a cacheable load or store instruction for loading or storing first memory data of the transaction, performing a cache miss operation on the cache based on a cache line associated with the first memory data not being cached in the cache; based on execution, by the processor, of a non-cacheable load instruction for loading second memory data of the transaction, loading an address of the second memory data into a non-cache-monitor for monitoring memory conflicts of non-cached lines without performing a cache miss operation on the cache based on a cache line associated with the second memory data not being cached; and aborting the TX transaction based on the non-cache monitor detecting a memory conflict from another processor, the memory conflict comprising requesting an access, by the other processor, to the address monitored by the non-cache monitor.

BRIEF DESCRIPTION OF THE SEVERAL VIEWS OF THE DRAWINGS

One or more aspects of the present disclosure are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 2:
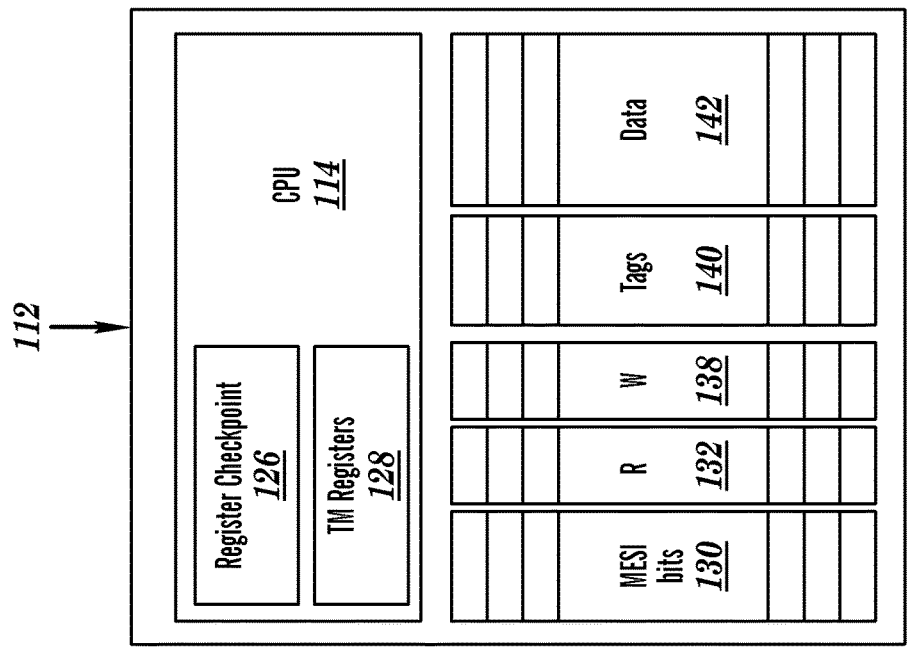
FIG. 2 is a schematic block diagram illustrating a transactional processor according to an embodiment of the disclosure.

Historically, a computer system or processor had only a single processor (aka processing unit or central processing unit). The processor included an instruction processing unit (IPU), a branch unit, a memory control unit and the like. Such processors were capable of executing a single thread of a program at a time. Operating systems were developed that could time-share a processor by dispatching a program to be executed on the processor for a period of time, and then dispatching another program to be executed on the processor for another period of time. As technology evolved, memory subsystem caches were often added to the processor as well as complex dynamic address translation including translation lookaside buffers (TLBs). The IPU itself was often referred to as a processor. As technology continued to evolve, an entire processor, could be packaged in a single semiconductor chip or die, such a processor was referred to as a microprocessor. Then processors were developed that incorporated multiple IPUs, such processors were often referred to as multi-processors. Each such processor of a multi-processor computer system (processor) may include individual or shared caches, memory interfaces, system bus, address translation mechanism and the like. Virtual machine and instruction set architecture (ISA) emulators added a layer of software to a processor, that provided the virtual machine with multiple "virtual processors" (aka processors) by time-slice usage of a single IPU in a single hardware processor. As technology further evolved, multi-threaded processors were developed, enabling a single hardware processor having a single multi-thread IPU to provide a capability of simultaneously executing threads of different programs, thus each thread of a multi-threaded processor appeared to the operating system as a processor. As technology further evolved, it was possible to put multiple processors (each having an IPU) on a single semiconductor chip or die. These processors were referred to processor cores or just cores. Thus the terms such as processor, central processing unit, processing unit, microprocessor, core, processor core, processor thread, thread for example are often used interchangeably. Aspects of embodiments herein may be practiced by any or all processors including those shown supra, without departing from the teachings herein. Wherein the term "thread" or "processor thread" is used herein, it is expected that particular advantage of the embodiment may be had in a processor thread implementation.

Transaction Execution in Intel® Based Embodiments

In "Intel® Architecture Instruction Set Extensions Programming Reference" 319433-012A, February 2012, incorporated by reference, Chapter 8 teaches, in part, that multithreaded applications may take advantage of increasing numbers of CPU cores to achieve higher performance. However, the writing of multi-threaded applications requires programmers to understand and take into account data sharing among the multiple threads. Access to shared data typically requires synchronization mechanisms. These synchronization mechanisms are used to ensure that multiple threads update shared data by serializing operations that are applied to the shared data, often through the use of a critical section that is protected by a lock. Since serialization limits concurrency, programmers try to limit the overhead due to synchronization.

Intel® Transactional Synchronization Extensions (Intel® TSX) allow a processor to dynamically determine whether threads need to be serialized through lock-protected critical sections, and to perform that serialization only when required. This allows the processor to expose and exploit concurrency that is hidden in an application because of dynamically unnecessary synchronization.

With Intel TSX, programmer-specified code regions (also referred to as "transactional regions" or just "transactions") are executed transactionally. If the transactional execution completes successfully, then all memory operations performed within the transactional region will appear to have occurred instantaneously when viewed from other processors. A processor makes the memory operations of the executed transaction, performed within the transactional region, visible to other processors only when a successful commit occurs, i.e., when the transaction successfully completes execution. This process is often referred to as an atomic commit.

Intel TSX provides two software interfaces to specify regions of code for transactional execution. Hardware Lock Elision (HLE) is a legacy compatible instruction set extension (comprising the XACQUIRE and XRELEASE prefixes) to specify transactional regions. Restricted Transactional Memory (RTM) is a new instruction set interface (comprising the XBEGIN, XEND, and XABORT instructions) for programmers to define transactional regions in a more flexible manner than that possible with HLE. HLE is for programmers who prefer the backward compatibility of the conventional mutual exclusion programming model and would like to run HLE-enabled software on legacy hardware but would also like to take advantage of the new lock elision capabilities on hardware with HLE support. RTM is for programmers who prefer a flexible interface to the transactional execution hardware. In addition, Intel TSX also provides an XTEST instruction. This instruction allows software to query whether the logical processor is transactionally executing in a transactional region identified by either HLE or RTM.

Since a successful transactional execution ensures an atomic commit, the processor executes the code region optimistically without explicit synchronization. If synchronization was unnecessary for that specific execution, execution can commit without any cross-thread serialization. If the processor cannot commit atomically, then the optimistic execution fails. When this happens, the processor will roll back the execution, a process referred to as a transactional abort. On a transactional abort, the processor will discard all updates performed in the memory region used by the transaction, restore architectural state to appear as if the optimistic execution never occurred, and resume execution non-transactionally.

A processor can perform a transactional abort for numerous reasons. A primary reason to abort a transaction is due to conflicting memory accesses between the transactionally executing logical processor and another logical processor. Such conflicting memory accesses may prevent a successful transactional execution. Memory addresses read from within a transactional region constitute the read-set of the transactional region and addresses written to within the transactional region constitute the write-set of the transactional region. Intel TSX maintains the read- and write-sets at the granularity of a cache line. A conflicting memory access occurs if another logical processor either reads a location that is part of the transactional region's write-set or writes a location that is a part of either the read- or write-set of the transactional region. A conflicting access typically means that serialization is required for this code region. Since Intel TSX detects data conflicts at the granularity of a cache line, unrelated data locations placed in the same cache line will be detected as conflicts that result in transactional aborts. Transactional aborts may also occur due to limited transactional resources. For example, the amount of data accessed in the region may exceed an implementation-specific capacity. Additionally, some instructions and system events may cause transactional aborts. Frequent transactional aborts result in wasted cycles and increased inefficiency.

Hardware Lock Elision

Hardware Lock Elision (HLE) provides a legacy compatible instruction set interface for programmers to use transactional execution. HLE provides two new instruction prefix hints: XACQUIRE and XRELEASE.

With HLE, a programmer adds the XACQUIRE prefix to the front of the instruction that is used to acquire the lock that is protecting the critical section. The processor treats the prefix as a hint to elide the write associated with the lock acquire operation. Even though the lock acquire has an associated write operation to the lock, the processor does not add the address of the lock to the transactional region's write-set nor does it issue any write requests to the lock. Instead, the address of the lock is added to the read-set. The logical processor enters transactional execution. If the lock was available before the XACQUIRE prefixed instruction, then all other processors will continue to see the lock as available afterwards. Since the transactionally executing logical processor neither added the address of the lock to its write-set nor performed externally visible write operations to the lock, other logical processors can read the lock without causing a data conflict. This allows other logical processors to also enter and concurrently execute the critical section protected by the lock. The processor automatically detects any data conflicts that occur during the transactional execution and will perform a transactional abort if necessary.

Even though the eliding processor did not perform any external write operations to the lock, the hardware ensures program order of operations on the lock. If the eliding processor itself reads the value of the lock in the critical section, it will appear as if the processor had acquired the lock, i.e. the read will return the non-elided value. This behavior allows an HLE execution to be functionally equivalent to an execution without the HLE prefixes.

An XRELEASE prefix can be added in front of an instruction that is used to release the lock protecting a critical section. Releasing the lock involves a write to the lock. If the instruction is to restore the value of the lock to the value the lock had prior to the XACQUIRE prefixed lock acquire operation on the same lock, then the processor elides the external write request associated with the release of the lock and does not add the address of the lock to the write-set. The processor then attempts to commit the transactional execution.

With HLE, if multiple threads execute critical sections protected by the same lock but they do not perform any conflicting operations on each other's data, then the threads can execute concurrently and without serialization. Even though the software uses lock acquisition operations on a common lock, the hardware recognizes this, elides the lock, and executes the critical sections on the two threads without requiring any communication through the lock—if such communication was dynamically unnecessary.

If the processor is unable to execute the region transactionally, then the processor will execute the region non-transactionally and without elision. HLE enabled software has the same forward progress guarantees as the underlying non-HLE lock-based execution. For successful HLE execution, the lock and the critical section code must follow certain guidelines. These guidelines only affect performance; and failure to follow these guidelines will not result in a functional failure. Hardware without HLE support will ignore the XACQUIRE and XRELEASE prefix hints and will not perform any elision since these prefixes correspond to the REPNE/REPE IA-32 prefixes which are ignored on the instructions where XACQUIRE and XRELEASE are valid. Importantly, HLE is compatible with the existing lock-based programming model. Improper use of hints will not cause functional bugs though it may expose latent bugs already in the code.

Restricted Transactional Memory (RTM) provides a flexible software interface for transactional execution. RTM provides three new instructions—XBEGIN, XEND, and XABORT—for programmers to start, commit, and abort a transactional execution.

The programmer uses the XBEGIN instruction to specify the start of a transactional code region and the XEND instruction to specify the end of the transactional code region. If the RTM region could not be successfully executed transactionally, then the XBEGIN instruction takes an operand that provides a relative offset to the fallback instruction address.

A processor may abort RTM transactional execution for many reasons. In many instances, the hardware automatically detects transactional abort conditions and restarts execution from the fallback instruction address with the architectural state corresponding to that present at the start of the XBEGIN instruction and the EAX register updated to describe the abort status.

The XABORT instruction allows programmers to abort the execution of an RTM region explicitly. The XABORT instruction takes an 8-bit immediate argument that is loaded into the EAX register and will thus be available to software following an RTM abort. RTM instructions do not have any data memory location associated with them. While the hardware provides no guarantees as to whether an RTM region will ever successfully commit transactionally, most transactions that follow the recommended guidelines are expected to successfully commit transactionally. However, programmers must always provide an alternative code sequence in the fallback path to guarantee forward progress. This may be as simple as acquiring a lock and executing the specified code region non-transactionally. Further, a transaction that always aborts on a given implementation may complete transactionally on a future implementation. Therefore, programmers must ensure the code paths for the transactional region and the alternative code sequence are functionally tested.

Detection of HLE Support

A processor supports HLE execution if CPUID.07H.EBX.HLE [bit 4]=1. However, an application can use the HLE prefixes (XACQUIRE and XRELEASE) without checking whether the processor supports HLE. Processors without HLE support ignore these prefixes and will execute the code without entering transactional execution.

Detection of RTM Support

A processor supports RTM execution if CPUID.07H.EBX.RTM [bit 11]=1. An application must check if the processor supports RTM before it uses the RTM instructions (XBEGIN, XEND, XABORT). These instructions will generate a #UD exception when used on a processor that does not support RTM.

Detection of XTEST Instruction

A processor supports the XTEST instruction if it supports either HLE or RTM. An application must check either of these feature flags before using the XTEST instruction. This instruction will generate a #UD exception when used on a processor that does not support either HLE or RTM.

Querying Transactional Execution Status

The XTEST instruction can be used to determine the transactional status of a transactional region specified by HLE or RTM. Note, while the HLE prefixes are ignored on processors that do not support HLE, the XTEST instruction will generate a #UD exception when used on processors that do not support either HLE or RTM.

Requirements for HLE Locks

For HLE execution to successfully commit transactionally, the lock must satisfy certain properties and access to the lock must follow certain guidelines.

An XRELEASE prefixed instruction must restore the value of the elided lock to the value it had before the lock acquisition. This allows hardware to safely elide locks by not adding them to the write-set. The data size and data address of the lock release (XRELEASE prefixed) instruction must match that of the lock acquire (XACQUIRE prefixed) and the lock must not cross a cache line boundary.

Software should not write to the elided lock inside a transactional HLE region with any instruction other than an XRELEASE prefixed instruction, otherwise such a write may cause a transactional abort. In addition, recursive locks (where a thread acquires the same lock multiple times without first releasing the lock) may also cause a transactional abort. Note that software can observe the result of the elided lock acquire inside the critical section. Such a read operation will return the value of the write to the lock.

The processor automatically detects violations to these guidelines, and safely transitions to a non-transactional execution without elision. Since Intel TSX detects conflicts at the granularity of a cache line, writes to data collocated on the same cache line as the elided lock may be detected as data conflicts by other logical processors eliding the same lock.

Transactional Nesting

Both HLE and RTM support nested transactional regions. However, a transactional abort restores state to the operation that started transactional execution: either the outermost XACQUIRE prefixed HLE eligible instruction or the outermost XBEGIN instruction. The processor treats all nested transactions as one transaction.

HLE Nesting and Elision

Programmers can nest HLE regions up to an implementation specific depth of MAX_HLE_NEST_COUNT. Each logical processor tracks the nesting count internally but this count is not available to software. An XACQUIRE prefixed HLE-eligible instruction increments the nesting count, and an XRELEASE prefixed HLE-eligible instruction decrements it. The logical processor enters transactional execution when the nesting count goes from zero to one. The logical processor attempts to commit only when the nesting count becomes zero. A transactional abort may occur if the nesting count exceeds MAX_HLE_NEST_COUNT.

In addition to supporting nested HLE regions, the processor can also elide multiple nested locks. The processor tracks a lock for elision beginning with the XACQUIRE prefixed HLE eligible instruction for that lock and ending with the XRELEASE prefixed HLE eligible instruction for that same lock. The processor can, at any one time, track up to a MAX_HLE_ELIDED_LOCKS number of locks. For example, if the implementation supports a MAX_HLE_ELIDED_LOCKS value of two and if the programmer nests three HLE identified critical sections (by performing XACQUIRE prefixed HLE eligible instructions on three distinct locks without performing an intervening XRELEASE prefixed HLE eligible instruction on any one of the locks), then the first two locks will be elided, but the third won't be elided (but will be added to the transaction's writeset). However, the execution will still continue transactionally. Once an XRELEASE for one of the two elided locks is encountered, a subsequent lock acquired through the XACQUIRE prefixed HLE eligible instruction will be elided.

The processor attempts to commit the HLE execution when all elided XACQUIRE and XRELEASE pairs have been matched, the nesting count goes to zero, and the locks have satisfied requirements. If execution cannot commit atomically, then execution transitions to a non-transactional execution without elision as if the first instruction did not have an XACQUIRE prefix.

RTM Nesting

Programmers can nest RTM regions up to an implementation specific MAX_RTM_NEST_COUNT. The logical processor tracks the nesting count internally but this count is not available to software. An XBEGIN instruction increments the nesting count, and an XEND instruction decrements the nesting count. The logical processor attempts to commit only if the nesting count becomes zero. A transactional abort occurs if the nesting count exceeds MAX_RTM_NEST_COUNT.

Nesting HLE and RTM

HLE and RTM provide two alternative software interfaces to a common transactional execution capability. Transactional processing behavior is implementation specific when HLE and RTM are nested together, e.g., HLE is inside RTM or RTM is inside HLE. However, in all cases, the implementation will maintain HLE and RTM semantics. An implementation may choose to ignore HLE hints when used inside RTM regions, and may cause a transactional abort when RTM instructions are used inside HLE regions. In the latter case, the transition from transactional to non-transactional execution occurs seamlessly since the processor will re-execute the HLE region without actually doing elision, and then execute the RTM instructions.

Abort Status Definition

RTM uses the EAX register to communicate abort status to software. Following an RTM abort the EAX register has the following definition.

TABLE 1

RTM Abort Status Definition

| EAX Register Bit Position | Meaning |
| --- | --- |
| 0 | Set if abort caused by XABORT instruction |
| 1 | If set, the transaction may succeed on retry, this bit is always clear if bit 0 is set |
| 2 | Set if another logical processor conflicted with a memory address that was part of the transaction that aborted |
| 3 | Set if an internal buffer overflowed |
| 4 | Set if a debug breakpoint was hit |
| 5 | Set if an abort occurred during execution of a nested transaction |

TABLE 1-continued

RTM Abort Status Definition

| EAX Register Bit Position | Meaning |
| --- | --- |
| 23:6 | Reserved |
| 31-24 | XABORT argument (only valid if bit 0 set, otherwise reserved) |

The EAX abort status for RTM only provides causes for aborts. It does not by itself encode whether an abort or commit occurred for the RTM region. The value of EAX can be 0 following an RTM abort. For example, a CPUID instruction when used inside an RTM region causes a transactional abort and may not satisfy the requirements for setting any of the EAX bits. This may result in an EAX value of 0.

RTM Memory Ordering

A successful RTM commit causes all memory operations in the RTM region to appear to execute atomically. A successfully committed RTM region consisting of an XBEGIN followed by an XEND, even with no memory operations in the RTM region, has the same ordering semantics as a LOCK prefixed instruction.

The XBEGIN instruction does not have fencing semantics. However, if an RTM execution aborts, then all memory updates from within the RTM region are discarded and are not made visible to any other logical processor.

RTM-Enabled Debugger Support

By default, any debug exception inside an RTM region will cause a transactional abort and will redirect control flow to the fallback instruction address with architectural state recovered and bit 4 in EAX set. However, to allow software debuggers to intercept execution on debug exceptions, the RTM architecture provides additional capability.

If bit 11 of DR7 and bit 15 of the IA32_DEBUGCTL_MSR are both 1, any RTM abort due to a debug exception (#DB) or breakpoint exception (#BP) causes execution to roll back and restart from the XBEGIN instruction instead of the fallback address. In this scenario, the EAX register will also be restored back to the point of the XBEGIN instruction.

Programming Considerations

Typical programmer-identified regions are expected to transactionally execute and commit successfully. However, Intel TSX does not provide any such guarantee. A transactional execution may abort for many reasons. To take full advantage of the transactional capabilities, programmers should follow certain guidelines to increase the probability of their transactional execution committing successfully.

This section discusses various events that may cause transactional aborts. The architecture ensures that updates performed within a transaction that subsequently aborts execution will never become visible. Only committed transactional executions initiate an update to the architectural state. Transactional aborts never cause functional failures and only affect performance.

Instruction Based Considerations

Programmers can use any instruction safely inside a transaction (HLE or RTM) and can use transactions at any privilege level. However, some instructions will always abort the transactional execution and cause execution to seamlessly and safely transition to a non-transactional path.

Intel TSX allows for most common instructions to be used inside transactions without causing aborts. The following operations inside a transaction do not typically cause an abort:

Operations on the instruction pointer register, general purpose registers (GPRs) and the status flags (CF, OF, SF, PF, AF, and ZF); and Operations on XMM and YMM registers and the MXCSR register.

However, programmers must be careful when intermixing SSE and AVX operations inside a transactional region. Intermixing SSE instructions accessing XMM registers and AVX instructions accessing YMM registers may cause transactions to abort. Programmers may use REP/REPNE prefixed string operations inside transactions. However, long strings may cause aborts. Further, the use of CLD and STD instructions may cause aborts if they change the value of the DF flag. However, if DF is 1, the STD instruction will not cause an abort. Similarly, if DF is 0, then the CLD instruction will not cause an abort.

Instructions not enumerated here as causing abort when used inside a transaction will typically not cause a transaction to abort (examples include but are not limited to MFENCE, LFENCE, SFENCE, RDTSC, RDTSCP, etc.).

The following instructions will abort transactional execution on any implementation:

XABORT
CPUID
PAUSE

In addition, in some implementations, the following instructions may always cause transactional aborts. These instructions are not expected to be commonly used inside typical transactional regions. However, programmers must not rely on these instructions to force a transactional abort, since whether they cause transactional aborts is implementation dependent.

Operations on X87 and MMX architecture state. This includes all MMX and X87 instructions, including the FXRSTOR and FXSAVE instructions.

Update to non-status portion of EFLAGS: CLI, STI, POPFD, POPFQ, CLTS.

Instructions that update segment registers, debug registers and/or control registers: MOV to DS/ES/FS/GS/SS, POP DS/ES/FS/GS/SS, LDS, LES, LFS, LGS, LSS, SWAPGS, WRFSBASE, WRGSBASE, LGDT, SGDT, LIDT, SIDT, LLDT, SLDT, LTR, STR, Far CALL, Far JMP, Far RET, IRET, MOV to DRx, MOV to CR0/CR2/CR3/CR4/CR8 and LMSW.

Ring transitions: SYSENTER, SYSCALL, SYSEXIT, and SYSRET.

TLB and Cacheability control: CLFLUSH, INVD, WBINVD, INVLPG, INVPCID, and memory instructions with a non-temporal hint (MOVNTDQA, MOVNTDQ, MOVNTI, MOVNTPD, MOVNTPS, and MOVNTQ).

Processor state save: XSAVE, XSAVEOPT, and XRSTOR.

Interrupts: INTn, INTO.

IO: IN, INS, REP INS, OUT, OUTS, REP OUTS and their variants.

VMX: VMPTRLD, VMPTRST, VMCLEAR, VMREAD, VMWRITE, VMCALL, VMLAUNCH, VMRESUME, VMXOFF, VMXON, INVEPT, and INVVPID.

SMX: GETSEC.

UD2, RSM, RDMSR, WRMSR, HLT, MONITOR, MWAIT, XSETBV, VZEROUPPER, MASKMOVQ, and V/MASKMOVDQU.

Runtime Considerations

In addition to the instruction-based considerations, runtime events may cause transactional execution to abort. These may be due to data access patterns or micro-architectural implementation features. The following list is not a comprehensive discussion of all abort causes.

Any fault or trap in a transaction that must be exposed to software will be suppressed. Transactional execution will abort and execution will transition to a non-transactional execution, as if the fault or trap had never occurred. If an exception is not masked, then that un-masked exception will result in a transactional abort and the state will appear as if the exception had never occurred.

Synchronous exception events (#DE, #OF, #NP, #SS, #GP, #BR, #UD, #AC, #XF, #PF, #NM, #TS, #MF, #DB, #BP/INT3) that occur during transactional execution may cause an execution not to commit transactionally, and require a non-transactional execution. These events are suppressed as if they had never occurred. With HLE, since the non-transactional code path is identical to the transactional code path, these events will typically re-appear when the instruction that caused the exception is re-executed non-transactionally, causing the associated synchronous events to be delivered appropriately in the non-transactional execution. Asynchronous events (NMI, SMI, INTR, IPI, PMI, etc.) occurring during transactional execution may cause the transactional execution to abort and transition to a non-transactional execution. The asynchronous events will be pended and handled after the transactional abort is processed.

Transactions only support write-back cacheable memory type operations. A transaction may always abort if the transaction includes operations on any other memory type. This includes instruction fetches to UC memory type.

Memory accesses within a transactional region may require the processor to set the Accessed and Dirty flags of the referenced page table entry. The behavior of how the processor handles this is implementation specific. Some implementations may allow the updates to these flags to become externally visible even if the transactional region subsequently aborts. Some Intel TSX implementations may choose to abort the transactional execution if these flags need to be updated. Further, a processor's page-table walk may generate accesses to its own transactionally written but uncommitted state. Some Intel TSX implementations may choose to abort the execution of a transactional region in such situations. Regardless, the architecture ensures that, if the transactional region aborts, then the transactionally written state will not be made architecturally visible through the behavior of structures such as TLBs.

Executing self-modifying code transactionally may also cause transactional aborts. Programmers must continue to follow the Intel recommended guidelines for writing self-modifying and cross-modifying code even when employing HLE and RTM. While an implementation of RTM and HLE will typically provide sufficient resources for executing common transactional regions, implementation constraints and excessive sizes for transactional regions may cause a transactional execution to abort and transition to a non-transactional execution. The architecture provides no guarantee of the amount of resources available to do transactional execution and does not guarantee that a transactional execution will ever succeed.

Conflicting requests to a cache line accessed within a transactional region may prevent the transaction from executing successfully. For example, if logical processor P0 reads line A in a transactional region and another logical processor P1 writes line A (either inside or outside a transactional region) then logical processor P0 may abort if logical processor P1's write interferes with processor P0's ability to execute transactionally.

Similarly, if P0 writes line A in a transactional region and P1 reads or writes line A (either inside or outside a transactional region), then P0 may abort if P1's access to line A interferes with P0's ability to execute transactionally. In addition, other coherence traffic may at times appear as conflicting requests and may cause aborts. While these false conflicts may happen, they are expected to be uncommon. The conflict resolution policy to determine whether P0 or P1 aborts in the above scenarios is implementation specific.

Generic Transaction Execution Embodiments:

According to "ARCHITECTURES FOR TRANSACTIONAL MEMORY", a dissertation submitted to the Department of Computer Science and the Committee on Graduate Studies of Stanford University in partial fulfillment of the requirements for the Degree of Doctor of Philosophy, by Austen McDonald, June 2009, incorporated by reference, fundamentally, there are three mechanisms needed to implement an atomic and isolated transactional region: versioning, conflict detection, and contention management.

To make a transactional code region appear atomic, all the modifications performed by that transactional code region must be stored and kept isolated from other transactions until commit time. The system does this by implementing a versioning policy. Two versioning paradigms exist: eager and lazy. An eager versioning system stores newly generated transactional values in place and stores previous memory values on the side, in what is called an undo-log. A lazy versioning system stores new values temporarily in what is called a write buffer, copying them to memory only on commit. In either system, the cache is used to optimize storage of new versions.

To ensure that transactions appear to be performed atomically, conflicts must be detected and resolved. The two systems, i.e., the eager and lazy versioning systems, detect conflicts by implementing a conflict detection policy, either optimistic or pessimistic. An optimistic system executes transactions in parallel, checking for conflicts only when a transaction commits. A pessimistic system checks for conflicts at each load and store. Similar to versioning, conflict detection also uses the cache, marking each line as either part of the read-set, part of the write-set, or both. The two systems resolve conflicts by implementing a contention management policy. Many contention management policies exist, some are more appropriate for optimistic conflict detection and some are more appropriate for pessimistic. Described below are some example policies.

Since each transactional memory (TM) system needs both versioning detection and conflict detection, these options give rise to four distinct TM designs: Eager-Pessimistic (EP), Eager-Optimistic (EO), Lazy- Pessimistic (LP), and Lazy-Optimistic (LO). Table 2 briefly describes all four distinct TM designs.

Figure 1:
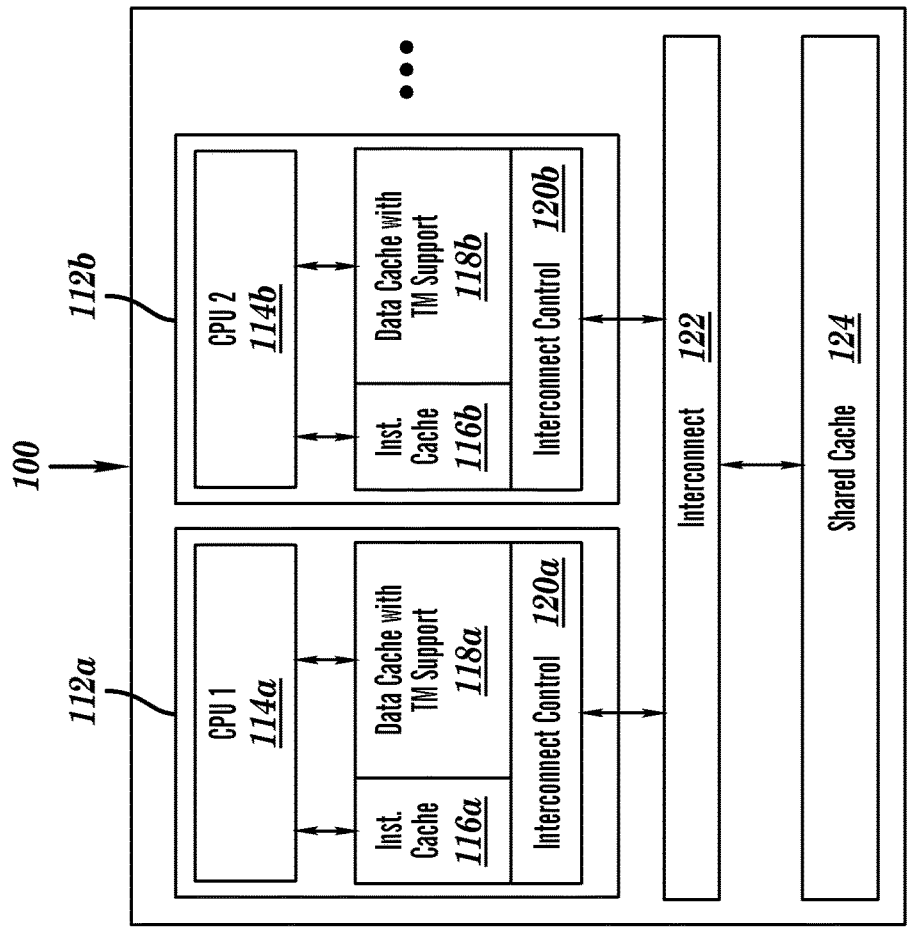
FIG. 1 is a schematic block diagram of an example multiple processor (CPU)/core Transactional Memory environment according to an embodiment of the disclosure.

FIGS. 1 and 2 depict an example of a multicore TM environment. FIG. 1 shows many TM-enabled CPUs (CPU1 114a, CPU2 114b, etc.) on one die 100, connected with an interconnect 122, under management of an interconnect control 120a, 120b. Each CPU 114a, 114b (also known as a Processor) may have a split cache consisting of an Instruction Cache 116a, 116b for caching instructions from memory to be executed and a Data Cache 118a, 118b with TM support for caching data (operands) of memory locations to be operated on by the CPU 114a, 114b (in FIG. 1, each CPU 114a, 114b and its associated caches are referenced as 112a, 112b). In an implementation, caches of multiple dies 100 are interconnected to support cache coherency between the caches of the multiple dies 100. In an implementation, a single cache, rather than the split cache is employed holding both instructions and data. In implementations, the CPU caches are one level of caching in a hierarchical cache structure. For example each die 100 may employ a shared cache 124 to be shared amongst all the CPUs on the die 100. In another implementation, each die may have access to a shared cache 124, shared amongst all the processors of all the dies 100.

FIG. 2 shows the details of an example transactional CPU 114, including additions to support TM. The transactional CPU (processor) 114 may include hardware for supporting Register Checkpoints 126 and special TM Registers 128. The transactional CPU cache may have the MESI bits 130, Tags 140 and Data 142 of a conventional cache but also, for example, R bits 132 showing a line has been read by the CPU 114 while executing a transaction and W bits 138 showing a line has been written-to by the CPU 114 while executing a transaction.

A key detail for programmers in any TM system is how non-transactional accesses interact with transactions. By design, transactional accesses are screened from each other using the mechanisms above. However, the interaction between a regular, non-transactional load and a transaction containing a new value for that address must still be considered. In addition, the interaction between a non-transactional store and a transaction that has read that address must also be explored. These are issues of the database isolation concept.

A TM system is said to implement strong isolation, sometimes called strong atomicity, when every non-transactional load and store acts like an atomic transaction. Therefore, non-transactional loads cannot see uncommitted data and non-transactional stores cause atomicity violations in any transactions that have read that address. A system where this is not the case is said to implement weak isolation, sometimes called weak atomicity.

Strong isolation is often more desirable than weak isolation due to the relative ease of conceptualization and implementation of strong isolation. Additionally, if a programmer has forgotten to surround some shared memory references with transactions, causing bugs, then with strong isolation, the programmer will often detect that oversight using a simple debug interface because the programmer will see a non-transactional region causing atomicity violations. Also, programs written in one model may work differently on another model.

Further, strong isolation is often easier to support in hardware TM than weak isolation. With strong isolation, since the coherence protocol already manages load and store communication between processors, transactions can detect non-transactional loads and stores and act appropriately. To implement strong isolation in software Transactional Memory (TM), non-transactional code must be modified to include read- and write-barriers; potentially crippling performance. Although great effort has been expended to remove many un-needed barriers, such techniques are often complex and performance is typically far lower than that of HTMs.

TABLE 2

Transactional Memory Design Space

| | | VERSIONING | |
|---|---|---|---|
| | | Lazy | Eager |
| CONFLICT DETECTION | Optimistic | Storing updates in a write buffer; detecting conflicts at commit time. | Not practical: waiting to update memory until commit time but detecting conflicts at access time guarantees wasted work and provides no advantage |
| | Pessimistic | Storing updates in a write buffer; detecting conflicts at access time. | Updating memory, keeping old values in undo log; detecting conflicts at access time. |

Table 2 illustrates the fundamental design space of transactional memory (versioning and conflict detection).

Eager-Pessimistic (EP)

This first TM design described below is known as Eager-Pessimistic. An EP system stores its write-set "in place" (hence the name "eager") and, to support rollback, stores the old values of overwritten lines in an "undo log". Processors use the W 138 and R 132 cache bits to track read and write-sets and detect conflicts when receiving snooped load requests. Perhaps the most notable examples of EP systems in known literature are LogTM and UTM.

Beginning a transaction in an EP system is much like beginning a transaction in other systems: tm_begin( ) takes a register checkpoint, and initializes any status registers. An EP system also requires initializing the undo log, the details of which are dependent on the log format, but often involve initializing a log base pointer to a region of pre-allocated, thread-private memory, and clearing a log bounds register.

Versioning: In EP, due to the way eager versioning is designed to function, the MESI 130 state transitions (cache line indicators corresponding to Modified, Exclusive, Shared, and Invalid code states) are left mostly unchanged. Outside of a transaction, the MESI 130 state transitions are left completely unchanged. When reading a line inside a transaction, the standard coherence transitions apply (S (Shared)→S, I (Invalid)→S, or I→E (Exclusive)), issuing a load miss as needed, but the R 132 bit is also set. Likewise, writing a line applies the standard transitions (S→M, E→I, I→M), issuing a miss as needed, but also sets the W 138 (Written) bit. The first time a line is written, the old version of the entire line is loaded then written to the undo log to preserve it in case the current transaction aborts. The newly written data is then stored "in-place," over the old data.

Conflict Detection: Pessimistic conflict detection uses coherence messages exchanged on misses, or upgrades, to look for conflicts between transactions. When a read miss occurs within a transaction, other processors receive a load request; but they ignore the request if they do not have the needed line. If the other processors have the needed line non-speculatively or have the line R 132 (Read), they downgrade that line to S, and in certain cases issue a cache-to-cache transfer if they have the line in MESI's 130 M or E state. However, if the cache has the line W 138, then a conflict is detected between the two transactions and additional action(s) must be taken.

Similarly, when a transaction seeks to upgrade a line from shared to modified (on a first write), the transaction issues an exclusive load request, which is also used to detect conflicts. If a receiving cache has the line non-speculatively, then the line is invalidated, and in certain cases a cache-to-cache transfer (M or E states) is issued. But, if the line is R 132 or W 138, a conflict is detected.

Validation: Because conflict detection is performed on every load, a transaction always has exclusive access to its own write-set. Therefore, validation does not require any additional work.

Commit: Since eager versioning stores the new version of data items in place, the commit process simply clears the W 138 and R 132 bits and discards the undo log.

Abort: When a transaction rolls back, the original version of each cache line in the undo log must be restored, a process called "unrolling" or "applying" the log. This is done during tm_discard( ) and must be atomic with regard to other transactions. Specifically, the write-set must still be used to detect conflicts: this transaction has the only correct version of lines in its undo log, and requesting transactions must wait for the correct version to be restored from that log. Such a log can be applied using a hardware state machine or software abort handler.

Eager-Pessimistic has the characteristics of: Commit is simple and since it is in-place, very fast. Similarly, validation is a no-op. Pessimistic conflict detection detects conflicts early, thereby reducing the number of "doomed" transactions. For example, if two transactions are involved in a Write-After-Read dependency, then that dependency is detected immediately in pessimistic conflict detection. However, in optimistic conflict detection such conflicts are not detected until the writer commits.

Eager-Pessimistic also has the characteristics of: As described above, the first time a cache line is written, the old value must be written to the log, incurring extra cache accesses. Aborts are expensive as they require undoing the log. For each cache line in the log, a load must be issued, perhaps going as far as main memory before continuing to the next line. Pessimistic conflict detection also prevents certain serializable schedules from existing.

Additionally, because conflicts are handled as they occur, there is a potential for livelock and careful contention management mechanisms must be employed to guarantee forward progress.

Lazy-Optimistic (LO)

Another popular TM design is Lazy-Optimistic (LO), which stores its write-set in a "write buffer" or "redo log" and detects conflicts at commit time (still using the R 132 and W 138 bits).

Versioning: Just as in the EP system, the MESI protocol of the LO design is enforced outside of the transactions. Once inside a transaction, reading a line incurs the standard MESI transitions but also sets the R 132 bit. Likewise, writing a line sets the W 138 bit of the line, but handling the MESI transitions of the LO design is different from that of the EP design. First, with lazy versioning, the new versions of written data are stored in the cache hierarchy until commit while other transactions have access to old versions available in memory or other caches. To make available the old versions, dirty lines (M lines) must be evicted when first written by a transaction. Second, no upgrade misses are needed because of the optimistic conflict detection feature: if a transaction has a line in the S state, it can simply write to it and upgrade that line to an M state without communicating the changes with other transactions because conflict detection is done at commit time.

Conflict Detection and Validation: To validate a transaction and detect conflicts, LO communicates the addresses of speculatively modified lines to other transactions only when it is preparing to commit. On validation, the processor sends one, potentially large, network packet containing all the addresses in the write-set. Data is not sent, but left in the cache of the committer and marked dirty (M). To build this packet without searching the cache for lines marked W, a simple bit vector is used, called a "store buffer," with one bit per cache line to track these speculatively modified lines. Other transactions use this address packet to detect conflicts: if an address is found in the cache and the R 132 and/or W 138 bits are set, then a conflict is initiated. If the line is found but neither R 132 nor W 138 is set, then the line is simply invalidated, which is similar to processing an exclusive load.

To support transaction atomicity, these address packets must be handled atomically, i.e., no two address packets may exist at once with the same addresses. In an LO system, this can be achieved by simply acquiring a global commit token before sending the address packet. However, a two-phase commit scheme could be employed by first sending out the address packet, collecting responses, enforcing an ordering protocol (perhaps oldest transaction first), and committing once all responses are satisfactory.

Commit: Once validation has occurred, commit needs no special treatment: simply clear W 138 and R 132 bits and the store buffer. The transaction's writes are already marked dirty in the cache and other caches' copies of these lines have been invalidated via the address packet. Other processors can then access the committed data through the regular coherence protocol.

Abort: Rollback is equally easy: because the write-set is contained within the local caches, these lines can be invalidated, then clear W 138 and R 132 bits and the store buffer. The store buffer allows W lines to be found to invalidate without the need to search the cache.

Lazy-Optimistic has the characteristics of: Aborts are very fast, requiring no additional loads or stores and making only local changes. More serializable schedules can exist than found in EP, which allows an LO system to more aggressively speculate that transactions are independent, which can yield higher performance. Finally, the late detection of conflicts can increase the likelihood of forward progress.

Lazy-Optimistic also has the characteristics of: Validation takes global communication time proportional to size of write set. Doomed transactions can waste work since conflicts are detected only at commit time.

Lazy-Pessimistic (LP)

Lazy-Pessimistic (LP) represents a third TM design option, sitting somewhere between EP and LO: storing newly written lines in a write buffer but detecting conflicts on a per access basis.

Versioning: Versioning is similar but not identical to that of LO: reading a line sets its R bit 132, writing a line sets its W bit 138, and a store buffer is used to track W lines in the cache. Also, dirty (M) lines must be evicted when first written by a transaction, just as in LO. However, since conflict detection is pessimistic, load exclusives must be performed when upgrading a transactional line from I, S→M, which is unlike LO.

Conflict Detection: LP's conflict detection operates the same as EP's: using coherence messages to look for conflicts between transactions.

Validation: Like in EP, pessimistic conflict detection ensures that at any point, a running transaction has no conflicts with any other running transaction, so validation is a no-op.

Commit: Commit needs no special treatment: simply clear W 138 and R 132 bits and the store buffer, like in LO.

Abort: Rollback is also like that of LO: simply invalidate the write-set using the store buffer and clear the W and R bits and the store buffer.

Eager-Optimistic (EO)

The LP has the characteristics of: Like LO, aborts are very fast. Like EP, the use of pessimistic conflict detection reduces the number of "doomed" transactions Like EP, some serializable schedules are not allowed and conflict detection must be performed on each cache miss.

The final combination of versioning and conflict detection is Eager-Optimistic (EO). EO may be a less than optimal choice for HTM systems: since new transactional versions are written in-place, other transactions have no choice but to notice conflicts as they occur (i.e., as cache misses occur). But since EO waits until commit time to detect conflicts, those transactions become "zombies," continuing to execute, wasting resources, yet are "doomed" to abort.

EO has proven to be useful in STMs and is implemented by Bartok-STM and McRT. A lazy versioning STM needs to check its write buffer on each read to ensure that it is reading the most recent value. Since the write buffer is not a hardware structure, this is expensive, hence the preference for write-in-place eager versioning. Additionally, since checking for conflicts is also expensive in an STM, optimistic conflict detection offers the advantage of performing this operation in bulk.

Contention Management

How a transaction rolls back once the system has decided to abort that transaction has been described above, but, since a conflict involves two transactions, the topics of which transaction should abort, how that abort should be initiated, and when should the aborted transaction be retried need to be explored. These are topics that are addressed by Contention Management (CM), a key component of transactional memory. Described below are policies regarding how the systems initiate aborts and the various established methods of managing which transactions should abort in a conflict.

Contention Management Policies

A Contention Management (CM) Policy is a mechanism that determines which transaction involved in a conflict should abort and when the aborted transaction should be retried. For example, it is often the case that retrying an aborted transaction immediately does not lead to the best performance. Conversely, employing a back-off mechanism, which delays the retrying of an aborted transaction, can yield better performance. STMs first grappled with finding the best contention management policies and many of the policies outlined below were originally developed for STMs.

CM Policies draw on a number of measures to make decisions, including ages of the transactions, size of read- and write-sets, the number of previous aborts, etc. The combinations of measures to make such decisions are endless, but certain combinations are described below, roughly in order of increasing complexity.

To establish some nomenclature, first note that in a conflict there are two sides: the attacker and the defender. The attacker is the transaction requesting access to a shared memory location. In pessimistic conflict detection, the attacker is the transaction issuing the load or load exclusive. In optimistic, the attacker is the transaction attempting to validate. The defender in both cases is the transaction receiving the attacker's request.

An Aggressive CM Policy immediately and always retries either the attacker or the defender. In LO, Aggressive means that the attacker always wins, and so Aggressive is sometimes called committer wins. Such a policy was used for the earliest LO systems. In the case of EP, Aggressive can be either defender wins or attacker wins.

Restarting a conflicting transaction that will immediately experience another conflict is bound to waste work—namely interconnect bandwidth refilling cache misses. A Polite CM Policy employs exponential backoff (but linear could also be used) before restarting conflicts. To prevent starvation, a situation where a process does not have resources allocated to it by the scheduler, the exponential backoff greatly increases the odds of transaction success after some n retries.

Another approach to conflict resolution is to randomly abort the attacker or defender (a policy called Randomized). Such a policy may be combined with a randomized backoff scheme to avoid unneeded contention.

However, making random choices, when selecting a transaction to abort, can result in aborting transactions that have completed "a lot of work", which can waste resources. To avoid such waste, the amount of work completed on the transaction can be taken into account when determining which transaction to abort. One measure of work could be a transaction's age. Other methods include Oldest, Bulk TM, Size Matters, Karma, and Polka. Oldest is a simple timestamp method that aborts the younger transaction in a conflict. Bulk TM uses this scheme. Size Matters is like Oldest but instead of transaction age, the number of read/written words is used as the priority, reverting to Oldest after a fixed number of aborts. Karma is similar, using the size of the write-set as priority. Rollback then proceeds after backing off a fixed amount of time. Aborted transactions keep their priorities after being aborted (hence the name Karma). Polka works like Karma but instead of backing off a predefined amount of time, it backs off exponentially more each time.

Since aborting wastes work, it is logical to argue that stalling an attacker until the defender has finished their transaction would lead to better performance. Unfortunately, such a simple scheme easily leads to deadlock.

Deadlock avoidance techniques can be used to solve this problem. Greedy uses two rules to avoid deadlock. The first rule is, if a first transaction, T1, has lower priority than a second transaction, T0, or if T1 is waiting for another transaction, then T1 aborts when conflicting with T0. The second rule is, if T1 has higher priority than T0 and is not waiting, then T0 waits until T1 commits, aborts, or starts waiting (in which case the first rule is applied). Greedy provides some guarantees about time bounds for executing a set of transactions. One EP design (LogTM) uses a CM policy similar to Greedy to achieve stalling with conservative deadlock avoidance.

Example MESI coherency rules provide for four possible states in which a cache line of a multiprocessor cache system may reside, M, E, S, and I, defined as follows:

Modified (M): The cache line is present only in the current cache, and is dirty; it has been modified from the value in main memory. The cache is required to write the data back to main memory at some time in the future, before permitting any other read of the (no longer valid) main memory state. The write-back changes the line to the Exclusive state.

Exclusive (E): The cache line is present only in the current cache, but is clean; it matches main memory. It may be changed to the Shared state at any time, in response to a read request. Alternatively, it may be changed to the Modified state when writing to it.

Shared (S): Indicates that this cache line may be stored in other caches of the machine and is "clean"; it matches the main memory. The line may be discarded (changed to the Invalid state) at any time.

Invalid (I): Indicates that this cache line is invalid (unused).

TM coherency status indicators (R 132, W 138) may be provided for each cache line, in addition to, or encoded in the MESI coherency bits. An R 132 indicator indicates the current transaction has read from the data of the cache line, and a W 138 indicator indicates the current transaction has written to the data of the cache line.

In another aspect of TM design, a system is designed using transactional store buffers. U.S. Pat. No. 6,349,361 titled "Methods and Apparatus for Reordering and Renaming Memory References in a Multiprocessor Computer System," filed Mar. 31, 2000 and incorporated by reference, teaches a method for reordering and renaming memory references in a multiprocessor computer system having at least a first and a second processor. The first processor has a first private cache and a first buffer, and the second processor has a second private cache and a second buffer. The method includes the steps of, for each of a plurality of gated store requests received by the first processor to store a datum, exclusively acquiring a cache line that contains the datum by the first private cache, and storing the datum in the first buffer. Upon the first buffer receiving a load request from the first processor to load a particular datum, the particular datum is provided to the first processor from among the data stored in the first buffer based on an in-order sequence of load and store operations. Upon the first cache receiving a load request from the second cache for a given datum, an error condition is indicated and a current state of at least one of the processors is reset to an earlier state when the load request for the given datum corresponds to the data stored in the first buffer.

The main implementation components of one such transactional memory facility are a transaction-backup register file for holding pre-transaction GR (general register) content, a cache directory to track the cache lines accessed during the transaction, a store cache to buffer stores until the transaction ends, and firmware routines to perform various complex functions. In this section a detailed implementation is described.

IBM zEnterprise EC12 Enterprise Server Embodiment

The IBM zEnterprise EC12 enterprise server introduces transactional execution (TX) in transactional memory, and is described in part in a paper, "Transactional Memory Architecture and Implementation for IBM System z" of Proceedings Pages 25-36 presented at MICRO-45, 1-5 Dec. 2012, Vancouver, British Columbia, Canada, available from IEEE Computer Society Conference Publishing Services (CPS), which is incorporated by reference.

Table 3 shows an example transaction. Transactions started with TBEGIN are not assured to ever successfully complete with TEND, since they can experience an aborting condition at every attempted execution, e.g., due to repeating conflicts with other CPUs. This requires that the program support a fallback path to perform the same operation non-transactionally, e.g., by using traditional locking schemes. This puts significant burden on the programming and software verification teams, especially where the fallback path is not automatically generated by a reliable compiler.

TABLE 3

| | | Example Transaction Code |
|---|---|---|
| loop | LHI | R0,0 | *initialize retry count=0 |
| | TBEGIN | | *begin transaction |

TABLE 3-continued

Example Transaction Code

|  |  |  |  |
|---|---|---|---|
|  | JNZ | abort | *go to abort code if CC1=0 |
|  | LT | R1, lock | *load and test the fallback lock |
|  | JNZ | lckbzy | *branch if lock busy |
|  | ... perform operation ... | | |
|  | TEND | | *end transaction |
|  | ... ... | ... ... | |
| lckbzy | TABORT | | *abort if lock busy; this *resumes after TBEGIN |
| abort | JO | fallback | *no retry if CC=3 |
|  | AHI | R0, 1 | *increment retry count |
|  | CIJNL | R0,6, fallback | *give up after 6 attempts |
|  | PPA | R0, TX | *random delay based on retry count |
|  | ... potentially wait for lock to become free ... | | |
|  | J | loop | *jump back to retry fallback |
|  | OBTAIN | lock | *using Compare&Swap |
|  | ... perform operation ... | | |
|  | RELEASE | lock | |
|  | ... ... | ... ... | |

The requirement of providing a fallback path for aborted Transaction Execution (TX) transactions can be onerous. Many transactions operating on shared data structures are expected to be short, touch only a few distinct memory locations, and use simple instructions only. For those transactions, the IBM zEnterprise EC12 introduces the concept of constrained transactions; under normal conditions, the CPU 114 assures that constrained transactions eventually end successfully, albeit without giving a strict limit on the number of necessary retries. A constrained transaction starts with a TBEGINC instruction and ends with a regular TEND. Implementing a task as a constrained or non-constrained transaction typically results in very comparable performance, but constrained transactions simplify software development by removing the need for a fallback path. IBM's Transactional Execution architecture is further described in z/Architecture, Principles of Operation, Tenth Edition, SA22-7832-09 published September 2012 from IBM, incorporated by reference.

A constrained transaction starts with the TBEGINC instruction. A transaction initiated with TBEGINC must follow a list of programming constraints; otherwise the program takes a non-filterable constraint-violation interruption. Exemplary constraints may include, but not be limited to: the transaction can execute a maximum of 32 instructions, all instruction text must be within 256 consecutive bytes of memory; the transaction contains only forward-pointing relative branches (i.e., no loops or subroutine calls); the transaction can access a maximum of 4 aligned octowords (an octoword is 32 bytes) of memory; and restriction of the instruction-set to exclude complex instructions like decimal or floating-point operations. The constraints are chosen such that many common operations like doubly linked list-insert/delete operations can be performed, including the very powerful concept of atomic compare-and-swap targeting up to 4 aligned octowords. At the same time, the constraints were chosen conservatively such that future CPU implementations can assure transaction success without needing to adjust the constraints, since that would otherwise lead to software incompatibility.

TBEGINC mostly behaves like XBEGIN in TSX or TBEGIN on IBM's zEC12 servers, except that the floating-point register (FPR) control and the program interruption filtering fields do not exist and the controls are considered to be zero. On a transaction abort, the instruction address is set back directly to the TBEGINC instead of to the instruction after, reflecting the immediate retry and absence of an abort path for constrained transactions.

Nested transactions are not allowed within constrained transactions, but if a TBEGINC occurs within a non-constrained transaction it is treated as opening a new non-constrained nesting level just like TBEGIN would. This can occur, e.g., if a non-constrained transaction calls a subroutine that uses a constrained transaction internally.

Since interruption filtering is implicitly off, all exceptions during a constrained transaction lead to an interruption into the operating system (OS). Eventual successful finishing of the transaction relies on the capability of the OS to page-in the at most 4 pages touched by any constrained transaction. The OS must also ensure time-slices long enough to allow the transaction to complete.

TABLE 4

Transaction Code Example

| | |
|---|---|
| TBEGINC | *begin constrained transaction |
| ... perform operation ... | |
| TEND | *end transaction |

Table 4 shows the constrained-transactional implementation of the code in Table 3, assuming that the constrained transactions do not interact with other locking-based code. No lock testing is shown therefore, but could be added if constrained transactions and lock-based code were mixed.

When failure occurs repeatedly, software emulation is performed using millicode as part of system firmware. Advantageously, constrained transactions have desirable properties because of the burden removed from programmers.

Figure 3:
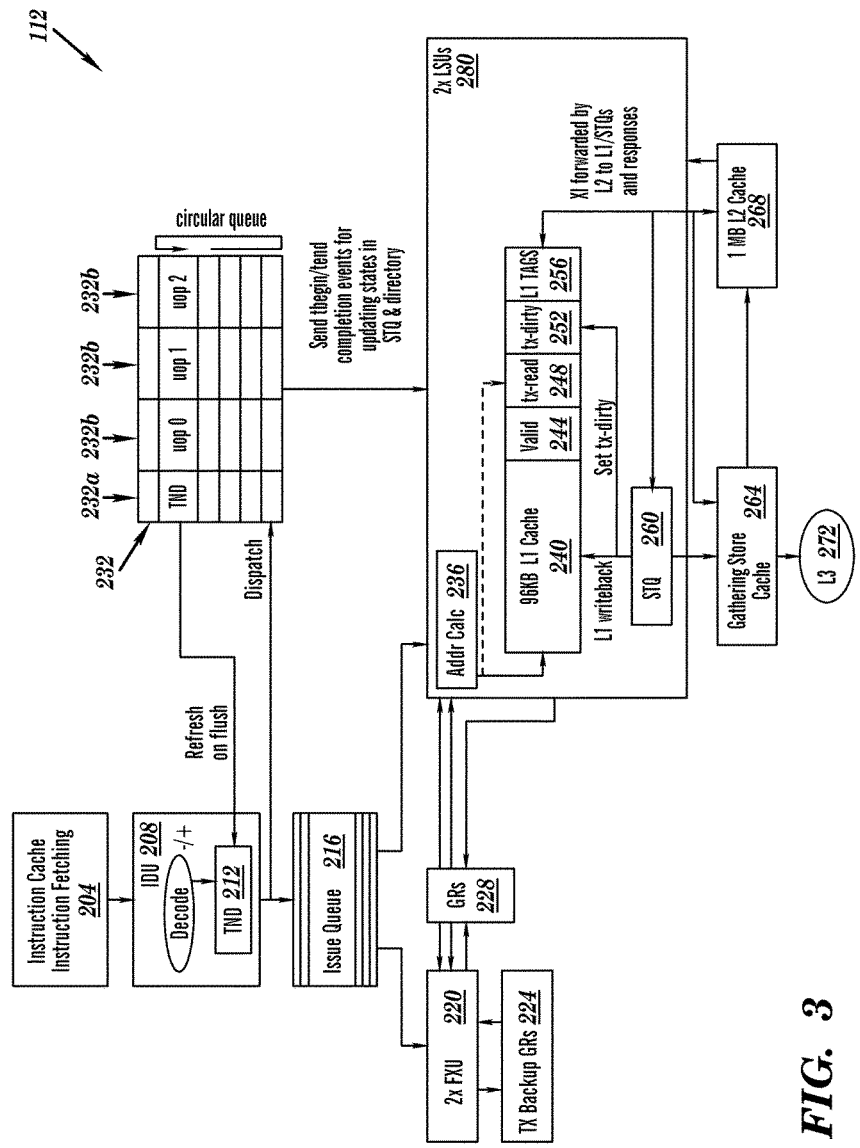
FIG. 3 is a schematic block diagram of exemplary components of a transactional processor (CPU) shown in FIGS. 1 and 2, according to an embodiment of the disclosure.

FIG. 3 is a schematic block diagram of exemplary components of one of the CPU-cache subsystems 112 shown in FIGS. 1 and 2. With reference to FIG. 3, the IBM zEnterprise EC12 processor introduced the transactional execution facility. The processor can decode 3 instructions per clock cycle; simple instructions are dispatched as single micro-ops, and more complex instructions are cracked into multiple micro-ops. The micro-ops (Uops 232*b*) are written into a unified issue queue 216, from where they can be issued out-of-order. Up to two fixed-point, one floating-point, two load/store, and two branch instructions can execute every cycle. A Global Completion Table (GCT) 232 holds every micro-op and a transaction nesting depth (TND) 232*a*. The GCT 232 is written in-order at decode time, tracks the execution status of each micro-op 232*b*, and completes instructions when all micro-ops 232*b* of the oldest instruction group have successfully executed.

The level 1 (L1) data cache 240 is a 96 KB (kilo-byte) 6-way associative cache with 256 byte cache-lines and 4 cycle use latency, coupled to a private 1 MB (mega-byte) 8-way associative 2nd-level (L2) data cache 268 with 7 cycles use-latency penalty for L1 240 misses. L1 240 cache is the cache closest to a processor and Ln cache is a cache at the nth level of caching. Both L1 240 and L2 268 caches are store-through. Six cores on each central processor (CP) chip share a 48 MB 3rd-level store-in cache, and six CP chips are connected to an off-chip 384 MB 4th-level cache, packaged together on a glass ceramic multi-chip module (MCM). Up to 4 multi-chip modules (MCMs) can be connected to a coherent symmetric multi-processor (SMP) system with up to 144 cores (not all cores are available to run customer workload).

Coherency is managed with a variant of the MESI protocol. Cache-lines can be owned read-only (shared) or exclusive; the L1 240 and L2 268 are store-through and thus do not contain dirty lines. The L3 272 and L4 caches (not shown) are store-in and track dirty states. Each cache is inclusive of all its connected lower level caches.

Coherency requests are called "cross interrogates" (XI) and are sent hierarchically from higher level to lower-level caches, and between the L4s. When one core misses the L1 240 and L2 268 and requests the cache line from its local L3 272, the L3 272 checks whether it owns the line, and if necessary sends an XI to the currently owning L2 268/L1 240 under that L3 272 to ensure coherency, before it returns the cache line to the requestor. If the request also misses the L3 272, the L3 272 sends a request to the L4 (not shown), which enforces coherency by sending XIs to all necessary L3s under that L4, and to the neighboring L4s. Then the L4 responds to the requesting L3 which forwards the response to the L2 268/L1 240.

Note that due to the inclusivity rule of the cache hierarchy, sometimes cache lines are XI'ed from lower-level caches due to evictions on higher-level caches caused by associativity overflows from requests to other cache lines. These XIs can be called "LRU XIs", where LRU stands for least recently used.

Making reference to yet another type of XI requests, Demote-XIs transition cache-ownership from exclusive into read-only state, and Exclusive-XIs transition cache ownership from exclusive into invalid state. Demote-XIs and Exclusive-XIs need a response back to the XI sender. The target cache can "accept" the XI, or send a "reject" response if it first needs to evict dirty data before accepting the XI. The L1 240/L2 268 caches are store through, but may reject demote-XIs and exclusive XIs if they have stores in their store queues that need to be sent to L3 before downgrading the exclusive state. A rejected XI will be repeated by the sender. Read-only-XIs are sent to caches that own the line read-only; no response is needed for such XIs since they cannot be rejected. The details of the SMP protocol are similar to those described for the IBM z10 by P. Mak, C. Walters, and G. Strait, in "IBM System z10 processor cache subsystem microarchitecture", IBM Journal of Research and Development, Vol. 53:1, 2009, which is incorporated by reference.

Transactional Instruction Execution

Referring to FIGS. 1-3, example components of an example CPU environment 112, include a CPU 114 and caches/components with which it interacts (such as those depicted in FIGS. 1 and 2). The instruction decode unit 208 (IDU) keeps track of the current transaction nesting depth 212 (TND). When the IDU 208 receives a TBEGIN instruction, the nesting depth 212 is incremented, and conversely decremented on TEND instructions. The nesting depth 212 is written into the GCT 232 for every dispatched instruction. When a TBEGIN or TEND is decoded on a speculative path that later gets flushed, the IDU's 208 nesting depth 212 is refreshed from the youngest GCT 232 entry that is not flushed. The transactional state is also written into the issue queue 216 for consumption by the execution units, mostly by the Load/Store Unit (LSU) 280, which also has an effective address calculator 236. The TBEGIN instruction may specify a transaction diagnostic block (TDB) for recording status information, should the transaction abort before reaching a TEND instruction.

Similar to the nesting depth, the IDU 208/GCT 232 collaboratively track the access register/floating-point register (AR/FPR) modification masks through the transaction nest; the IDU 208 can place an abort request into the GCT 232 when an AR/FPR-modifying instruction is decoded and the modification mask blocks that. When the instruction becomes next-to-complete, completion is blocked and the transaction aborts. Other restricted instructions are handled similarly, including TBEGIN if decoded while in a constrained transaction, or exceeding the maximum nesting depth.

An outermost TBEGIN is cracked into multiple micro-ops depending on the GR-Save-Mask; each micro-op 232b (including, for example uop 0, uop 1, and uop 2) will be executed by one of the two fixed point units (FXUs) 220 to save a pair of GRs 228 into a special transaction-backup register file 224, that is used to later restore the GR 228 content in case of a transaction abort. Also the TBEGIN spawns micro-ops 232b to perform an accessibility test for the TDB if one is specified; the address is saved in a special purpose register for later usage in the abort case. At the decoding of an outermost TBEGIN, the instruction address and the instruction text of the TBEGIN are also saved in special purpose registers for a potential abort processing later on.

TEND and NTSTG are single micro-op 232b instructions; NTSTG (non-transactional store) is handled like a normal store except that it is marked as non-transactional in the issue queue 216 so that the LSU 280 can treat it appropriately. TEND is a no-op at execution time, the ending of the transaction is performed when TEND completes.

As mentioned, instructions that are within a transaction are marked as such in the issue queue 216, but otherwise execute mostly unchanged; the LSU 280 performs isolation tracking as described in the next section.

Since decoding is in-order, and since the IDU 208 keeps track of the current transactional state and writes it into the issue queue 216 along with every instruction from the transaction, execution of TBEGIN, TEND, and instructions before, within, and after the transaction can be performed out-of order. It is even possible (though unlikely) that TEND is executed first, then the entire transaction, and lastly the TBEGIN executes. Program order is restored through the GCT 232 at completion time. The length of transactions is not limited by the size of the GCT 232, since general purpose registers (GRs) 228 can be restored from the backup register file 224.

During execution, the program event recording (PER) events are filtered based on the Event Suppression Control, and a PER TEND event is detected if enabled. Similarly, while in transactional mode, a pseudo-random generator may be causing the random aborts as enabled by the Transaction Diagnostics Control.

Tracking for Transactional Isolation

The Load/Store Unit 280 tracks cache lines that were accessed during transactional execution, and triggers an abort if an XI from another CPU (or an LRU-XI) conflicts with the footprint. If the conflicting XI is an exclusive or demote XI, the LSU 280 rejects the XI back to the L3 272 in the hope of finishing the transaction before the L3 272 repeats the XI. This "stiff-arming" is very efficient in highly contended transactions. In order to prevent hangs when two CPUs stiff-arm each other, a XI-reject counter is implemented, which triggers a transaction abort when a threshold is met.

The L1 cache directory 240 is traditionally implemented with static random access memories (SRAMs). For the transactional memory implementation, the valid bits 244 (64 rows×6 ways) of the directory have been moved into normal logic latches, and are supplemented with two more bits per cache line: the TX-read 248 and TX-dirty 252 bits.

The TX-read 248 bits are reset when a new outermost TBEGIN is decoded (which is interlocked against a prior still pending transaction). The TX-read 248 bit is set at execution time by every load instruction that is marked "transactional" in the issue queue. Note that this can lead to over-marking if speculative loads are executed, for example on a mispredicted branch path. The alternative of setting the TX-read 248 bit at load completion time was too expensive for silicon area, since multiple loads can complete at the same time, requiring many read-ports on the load-queue.

Stores execute the same way as in non-transactional mode, but a transaction mark is placed in the store queue (STQ) 260 entry of the store instruction. At write-back time, when the data from the STQ 260 is written into the L1 240, the TX-dirty bit 252 in the L1-directory 256 is set for the written cache line. Store write-back into the L1 240 occurs only after the store instruction has completed, and at most one store is written back per cycle. Before completion and write-back, loads can access the data from the STQ 260 by means of store-forwarding; after write-back, the CPU 114 (FIG. 2) can access the speculatively updated data in the L1 240. If the transaction ends successfully, the TX-dirty bits 252 of all cache-lines are cleared, and also the TX-marks of not yet written stores are cleared in the STQ 260, effectively turning the pending stores into normal stores.

On a transaction abort, all pending transactional stores are invalidated from the STQ 260, even those already completed. All cache lines that were modified by the transaction in the L1 240, that is, have the TX-dirty bit 252 on, have their valid bits turned off, effectively removing them from the L1 240 cache instantaneously.

The architecture requires that before completing a new instruction, the isolation of the transaction read- and write-set is maintained. This isolation is ensured by stalling instruction completion at appropriate times when XIs are pending; speculative out-of order execution is allowed, optimistically assuming that the pending XIs are to different addresses and not actually cause a transaction conflict. This design fits very naturally with the XI-vs-completion interlocks that are implemented on prior systems to ensure the strong memory ordering that the architecture requires.

When the L1 240 receives an XI, L1 240 accesses the directory to check validity of the XI'ed address in the L1 240, and if the TX-read bit 248 is active on the XI'ed line and the XI is not rejected, the LSU 280 triggers an abort. When a cache line with active TX-read bit 248 is LRU'ed from the L1 240, a special LRU-extension vector remembers for each of the 64 rows of the L1 240 that a TX-read line existed on that row. Since no precise address tracking exists for the LRU extensions, any non-rejected XI that hits a valid extension row the LSU 280 triggers an abort. Providing the LRU-extension effectively increases the read footprint capability from the L1-size to the L2-size and associativity, provided no conflicts with other CPUs 114 (FIG. 1) against the non-precise LRU-extension tracking causes aborts.

The store footprint is limited by the store cache size (the store cache is discussed in more detail below) and thus implicitly by the L2 268 size and associativity. No LRU-extension action needs to be performed when a TX-dirty 252 cache line is LRU'ed from the L1 240.

Store Cache

In prior systems, since the L1 240 and L2 268 are store-through caches, every store instruction causes an L3 272 store access; with now 6 cores per L3 272 and further improved performance of each core, the store rate for the L3 272 (and to a lesser extent for the L2 268) becomes problematic for certain workloads. In order to avoid store queuing delays, a gathering store cache 264 had to be added, that combines stores to neighboring addresses before sending them to the L3 272.

For transactional memory performance, it is acceptable to invalidate every TX-dirty 252 cache line from the L1 240 on transaction aborts, because the L2 268 cache is very close (7 cycles L1 240 miss penalty) to bring back the clean lines. However, it would be unacceptable for performance (and silicon area for tracking) to have transactional stores write the L2 268 before the transaction ends and then invalidate all dirty L2 268 cache lines on abort (or even worse on the shared L3 272).

The two problems of store bandwidth and transactional memory store handling can both be addressed with the gathering store cache 264. The cache 232 is a circular queue of 64 entries, each entry holding 128 bytes of data with byte-precise valid bits. In non-transactional operation, when a store is received from the LSU 280, the store cache checks whether an entry exists for the same address, and if so gathers the new store into the existing entry. If no entry exists, a new entry is written into the queue, and if the number of free entries falls under a threshold, the oldest entries are written back to the L2 268 and L3 272 caches.

When a new outermost transaction begins, all existing entries in the store cache are marked closed so that no new stores can be gathered into them, and eviction of those entries to L2 268 and L3 272 is started. From that point on, the transactional stores coming out of the LSU 280 STQ 260 allocate new entries, or gather into existing transactional entries. The write-back of those stores into L2 268 and L3 272 is blocked, until the transaction ends successfully; at that point subsequent (post-transaction) stores can continue to gather into existing entries, until the next transaction closes those entries again.

The store cache is queried on every exclusive or demote XI, and causes an XI reject if the XI compares to any active entry. If the core is not completing further instructions while continuously rejecting XIs, the transaction is aborted at a certain threshold to avoid hangs.

The LSU 280 requests a transaction abort when the store cache overflows. The LSU 280 detects this condition when it tries to send a new store that cannot merge into an existing entry, and the entire store cache is filled with stores from the current transaction. The store cache is managed as a subset of the L2 268: while transactionally dirty lines can be evicted from the L1 240, they have to stay resident in the L2 268 throughout the transaction. The maximum store footprint is thus limited to the store cache size of 64×128 bytes, and it is also limited by the associativity of the L2 268. Since the L2 268 is 8-way associative and has 512 rows, it is typically large enough to not cause transaction aborts.

If a transaction aborts, the store cache is notified and all entries holding transactional data are invalidated. The store cache also has a mark per doubleword (8 bytes) whether the entry was written by a NTSTG instruction—those doublewords stay valid across transaction aborts.

Millicode-Implemented Functions

Traditionally, IBM mainframe server processors contain a layer of firmware called millicode which performs complex functions like certain CISC instruction executions, interruption handling, system synchronization, and RAS. Millicode includes machine dependent instructions as well as instructions of the instruction set architecture (ISA) that are fetched and executed from memory similarly to instructions of application programs and the operating system (OS). Firmware resides in a restricted area of main memory that customer programs cannot access. When hardware detects a situation that needs to invoke millicode, the instruction fetching unit 204 switches into "millicode mode" and starts fetching at the appropriate location in the millicode memory area. Millicode may be fetched and executed in the same way as instructions of the instruction set architecture (ISA), and may include ISA instructions.

For transactional memory, millicode is involved in various complex situations. Every transaction abort invokes a dedicated millicode sub-routine to perform the necessary abort steps. The transaction-abort millicode starts by reading special-purpose registers (SPRs) holding the hardware internal abort reason, potential exception reasons, and the aborted instruction address, which millicode then uses to store a TDB if one is specified. The TBEGIN instruction text is loaded from an SPR to obtain the GR-save-mask, which is needed for millicode to know which GRs 228 to restore.

The CPU 114 (FIG. 2) supports a special millicode-only instruction to read out the backup-GRs 224 and copy them into the main GRs 228. The TBEGIN instruction address is also loaded from an SPR to set the new instruction address in the PSW to continue execution after the TBEGIN once the millicode abort sub-routine finishes. That PSW may later be saved as program-old PSW in case the abort is caused by a non-filtered program interruption.

The TABORT instruction may be millicode implemented; when the IDU 208 decodes TABORT, it instructs the instruction fetch unit to branch into TABORT's millicode, from which millicode branches into the common abort sub-routine.

The Extract Transaction Nesting Depth (ETND) instruction may also be millicoded, since it is not performance critical; millicode loads the current nesting depth out of a special hardware register and places it into a GR 228. The PPA instruction is millicoded; it performs the optimal delay based on the current abort count provided by software as an operand to PPA, and also based on other hardware internal state.

For constrained transactions, millicode may keep track of the number of aborts. The counter is reset to 0 on successful TEND completion, or if an interruption into the OS occurs (since it is not known if or when the OS will return to the program). Depending on the current abort count, millicode can invoke certain mechanisms to improve the chance of success for the subsequent transaction retry. The mechanisms involve, for example, successively increasing random delays between retries, and reducing the amount of speculative execution to avoid encountering aborts caused by speculative accesses to data that the transaction is not actually using. As a last resort, millicode can broadcast to other CPUs 114 (FIG. 2) to stop all conflicting work, retry the local transaction, before releasing the other CPUs 114 to continue normal processing. Multiple CPUs 114 must be coordinated to not cause deadlocks, so some serialization between millicode instances on different CPUs 114 is required.

Various embodiments of the disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

A sequence of program instructions or a logical assembly of one or more interrelated modules defined by one or more computer readable program code means or logic direct the performance of one or more aspects of the present disclosure.

Although one or more examples have been provided herein, these are only examples. Many variations are possible without departing from the spirit of the present disclosure. For instance, processing environments other than the examples provided herein may include and/or benefit from one or more aspects of the present disclosure. Further, the environment need not be based on the z/Architecture®, but instead can be based on other architectures offered by, for instance, IBM®, Intel®, Sun Microsystems, as well as others. Yet further, the environment can include multiple processors, be partitioned, and/or be coupled to other systems, as examples.

As used herein, the term "obtaining" includes, but is not limited to, fetching, receiving, having, providing, being provided, creating, developing, etc.

The capabilities of one or more aspects of the present disclosure can be implemented in software, firmware, hardware, or some combination thereof. At least one program storage device readable by a machine embodying at least one program of instructions executable by the machine to perform the capabilities of the present disclosure can be provided.

The flow diagrams depicted herein are just examples. There may be many variations to these diagrams or the steps (or operations) described therein without departing from the spirit of the disclosure. For instance, the steps may be performed in a differing order, or steps may be added, deleted, or modified. All of these variations are considered a part of the claimed disclosure.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

U.S. Pat. No. 5,802,572 to Patel et al., titled "Write-Back Cache Having Sub-Line Size Coherency Granularity and Method for Maintaining Coherency Within a Write-Back Cache," filed Mar. 15, 1996, and incorporated by reference, teaches a write-back cache memory and method for maintaining coherency within a write-back cache memory. The write-back cache memory includes a number of cache lines for storing data associated with addresses within an associated memory. Each of the cache lines comprises multiple byte sets. The write-back cache memory also includes coherency indicia for identifying each byte set among the multiple byte sets within a cache line which contains data that differs from data stored in corresponding addresses within the associated memory. The write-back cache memory further includes cache control logic, which, upon replacement of a particular cache line within the write-back cache memory, writes only identified byte sets to the associated memory, such that memory accesses and bus utilization are minimized.

A cache is a small amount of expensive high-speed memory, which is commonly utilized within a data processing system to improve the access time to data stored within an associated memory, thereby decreasing processor latency. A cache typically comprises a number of cache lines, which each include several bytes of data. Data stored within memory is mapped into a cache utilizing an index portion of the memory addresses associated with the data, such that multiple memory addresses having the same index portion map to the same cache line. Cached data associated with a particular memory address is distinguished from data associated with other addresses having the same index portion by an address tag, typically the high order address bits, which is stored in association with the cached data. In order to minimize the conflict between data associated with addresses having identical index portions, many caches provide multiple ways or storage locations for each cache line.

When data requested by the processor does not reside within the cache, a cache miss occurs and the requested data is fetched from memory. In order to accommodate the requested data within the cache, the data resident within a way of the cache line to which the requested data maps often must be replaced or "cast-out." If the cache has multiple ways, the replaced cache location is typically selected utilizing an algorithm, such as a least recently used (LRU) algorithm, in order to avoid casting-out data that has a high probability of being requested by the processor. A cache location can be similarly replaced or "pushed-out" if a snoop of the cache location reveals that the data contained within the cache location is inconsistent with more recent data stored within the corresponding memory address.

Coherency between cached data and data stored in memory is enforced by a cache coherency protocol, typically implemented by the processor or a cache controller. If a data access is designated as a write-through, any update to the cached data is automatically written to memory, thus enforcing coherency between the cache and the memory upon the completion of the data access. Write-back caches, on the other hand, enforce data coherency only when a copy-back operation is performed in response to a cache line replacement or during periods of low bus activity. Because write-back caches entail lower bus utilization, write-back caches are generally preferable to write-through caches from a performance standpoint if the software and hardware environment permit the concomitant looser coherency.

Cache coherency and replacement operations are typically performed on a line-by-line basis. Accordingly, each way of each cache line within a conventional write-back cache has an associated bit that indicates whether any of the data bytes contained within the way have been modified since the data bytes were written into the cache. When a way that contains modified data is replaced, a copyback operation is invoked that writes each byte of the replaced way to the corresponding memory address. Because the length of a cache line is typically several times the bandwidth of the bus to which the cache is coupled, such copyback operations usually require several multi-cycle bus transactions or "beats" to complete.

Variable Line-Size (VLS) Cache
Terminology

In VLS cache, a SRAM (cache) cell array and a DRAM (main memory) cell array are divided into several subarrays. Data transfer for cache replacements is performed between corresponding SRAM and DRAM subarrays. Terminology for VLS Caches Address-block, or subline, is a block of data associated with a single tag in the cache. Transfer-block, or line, is a block of data transferred at once between the cache and main memory. The address-blocks from every SRAM subarray, which have the same cache-index, form a cache-sector. A cache-sector and an address block which are being accessed during a cache lookup are called a reference-sector and a reference-subline, respectively. When a memory reference from the processor is found a cache hit, referenced data resides in the reference-subline. Otherwise, referenced data is not in the reference-subline but only in the main memory. A memory-sector is a block of data in the main-memory, and corresponds to the cache-sector. Adjacent-subline is defined as follows:

It resides in the reference-sector, but is not the reference-subline;

Its home location in the main-memory is in the same memory-sector as that of the data which is currently being referenced by the processor; and It has been referenced at least once since it was fetched into the cache.

Concept and Principle of Operations

To make good use of the high on-chip memory bandwidth, the VLS cache adjusts its transfer-block size according to the characteristics of programs. When programs have rich spatial locality, the VLS cache would determine to use larger transfer-blocks, each of which consists of lots of address-blocks. Conversely, the VLS cache would determine to use smaller transfer blocks, each of which consists of a single or a few address-blocks, and could try to avoid cache conflicts.

The construction of the direct-mapped VLS cache is similar to that of a conventional 4-way set-associative cache. However, the conventional 4-way set-associative cache has four locations where a sub-line can be placed, while the direct-mapped VLS cache has only one location for a sub-line, just like a conventional direct-mapped cache. Since the VLS cache can avoid cache conflicts without increasing the cache associativity, the access time of it (i.e., hit time) is shorter than that of conventional caches with higher associativity.

The VLS cache works as follows. When a memory access takes place, the cache tag array is looked up in the same manner as normal caches, except that every SRAM subarray has its own tag memory and the lookup is performed on every tag memory. On cache hit, the hit address-block has the required data, and the memory access performs on this address-block in the same manner as normal caches.

On cache miss, a cache refill takes place as follows. According to the designated transfer-block size, one or more address-blocks are written back from the indexed cache-sector to their home locations in the DRAM main memory. According to the designated transfer-block size, one or more address-blocks (one of which contains the required data) are fetched from the memory-sector to the cache-sector.

For example, VLS cache can have three possible transfer-block sizes as follows:

Minimum transfer-block size, where only the designated address-block is involved in cache replacements.

Medium transfer-block size, where the designated address-block and one of its neighborhood in the corresponding cache-sector are involved.

Maximum transfer-block size, where the designated address-block and all of its neighborhood in the corresponding cache-sector are involved.

Dynamically VLS (D-VLS) Cache Architecture

The performance of the VLS cache depends heavily on how well the cache replacement is performed with optimal transfer-block size. However, the amount of spatial locality may vary both within and among program executions. The line-size determiner for the D-VLS cache selects adequate line-sizes based on recently observed data reference behavior.

The D-VLS cache works as follows. The address generated by the processor is divided into the byte offset within an address-block, subarray field designating the subarray, index field used for indexing the tag memory, and tag field. Each cache subarray has its own tag memory and comparator, and it can perform the tag-memory lookup using the index and tag fields independently with each other. At the same time, the LSS corresponding to the reference-sector is read using the index field from the LSS-table. One of the tag-comparison results is selected by the subarray field of the address, and then the cache hit or miss is determined. On cache miss, a cache replacement is performed according to the state of the LSS. Regardless of hits or misses, the LSD determines the state of the LSS. After that, the LSD writes back the modified LSS to the LSS-table.

Line-Size Determiner Algorithm

The algorithm for determining adequate transfer-block sizes is very simple. This algorithm is based on not memory-access history but the current state of the reference-sector. This means that no information of evicted data from the cache need to be maintained. On every cache lookup, the LSD determines the state of the LSS of the reference-sector, as follows:

The LSD investigates how many adjacent-sublines exist in the reference-sector using all the reference flag bits and the tag-comparison results.

Based on the above-mentioned investigation result and the current state of the LSS of the reference sector, the LSD determines the next state of the LSS.

If there are many neighboring adjacent-sublines, the reference-sector has good spatial locality. This is because the data currently being accessed by the processor and the adjacent-sublines are fetched from the same memory-sector, and these sublines have been accessed by the processor recently. In this case, the transfer-block size should become larger. Thus the state may transit from the minimum state (32-byte line) to the medium state (64-byte line) or from the medium (64-byte line) state to the maximum state (128-byte line) when the reference-subline and adjacent-sublines construct a larger line-size than the current line-size.

In contrast, if the reference-sector has been accessed sparsely before the current, this reference-sector has poor spatial locality at that time. In this case, the transfer-block size should become smaller.

Figure 4:
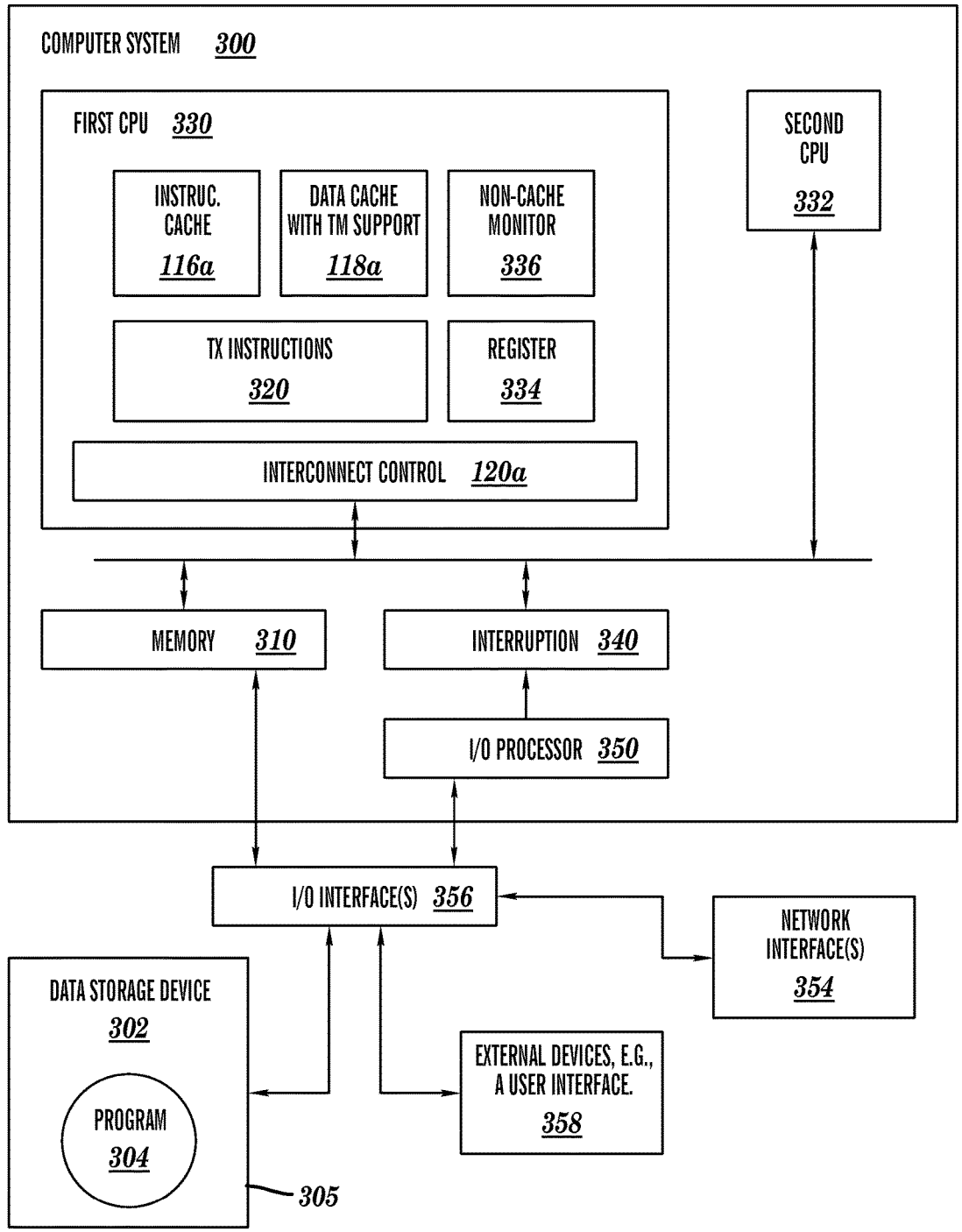
FIG. 4 is a schematic block diagram of a generic computer system having similar components as the multi processor systems shown in FIGS. 1-3, for allowing non-cacheable loads in a hardware transactional memory environment according to an embodiment of the disclosure.
Figure 6:
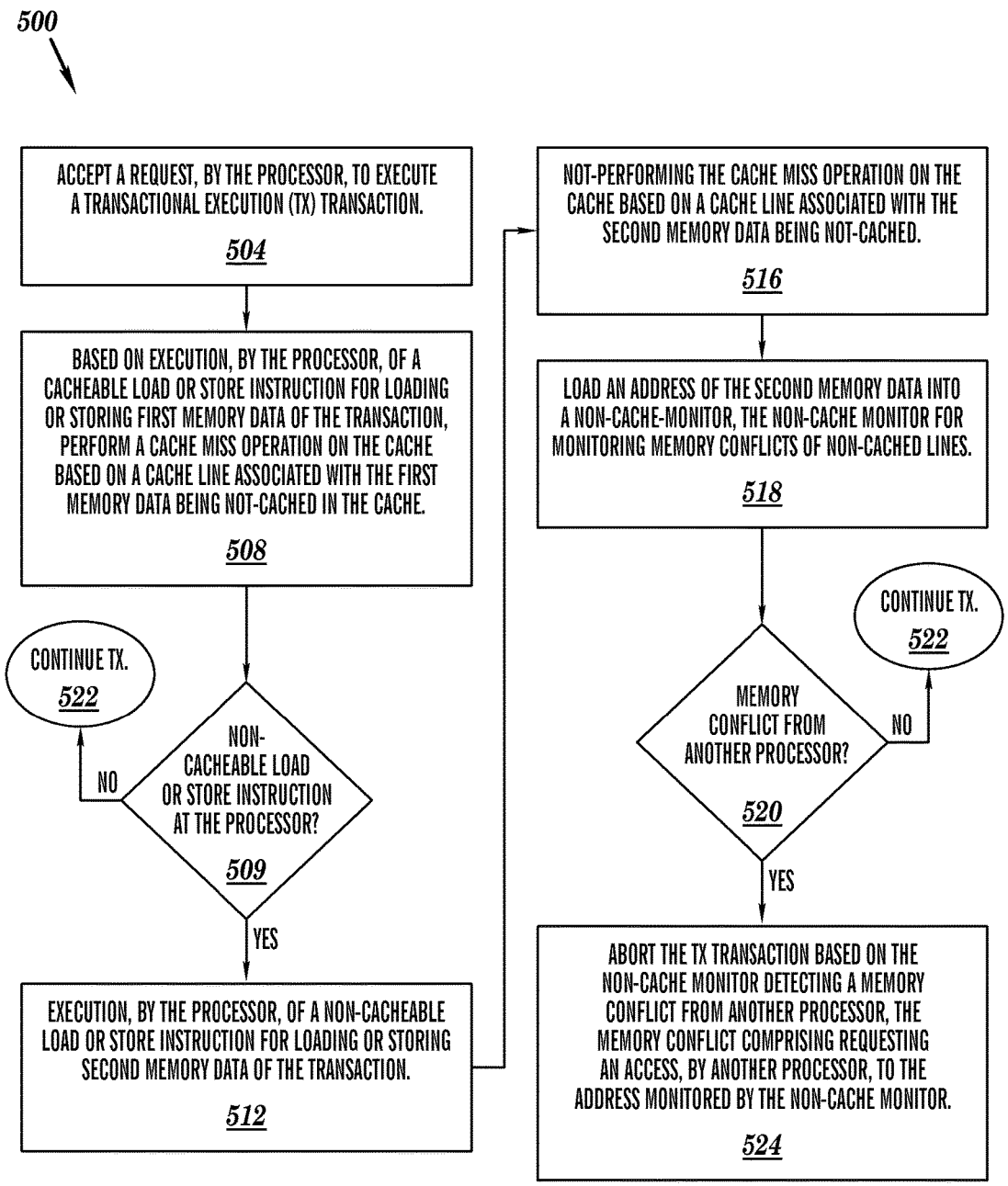
FIG. 6 is a flow chart of a method for allowing non-cacheable loads in a hardware transactional memory environment, according to an embodiment of the disclosure.

Referring to FIGS. 4 and 6, computer implemented embodiments 300, 500 for allowing non-cacheable loads in a hardware transactional memory environment is described according to an example embodiment of the present disclosure. The computer comprises a processor in communication with a memory, which can be by way of a hierarchical cache subsystem, wherein transactional loads, by the processor, are monitored in a cache. The computer system 300 shown in FIG. 4 has some of the same elements (which have the same reference numerals) as the exemplary computer system 100 shown in FIG. 1.

Referring to FIG. 4, the computer system 300 is a generic representation of a TX environment according to the embodiment of the disclosure. The computer system 300 of FIG. 4 may have similar components to the computer system(s) shown in FIGS. 1-3, and is directed to the embodiments of the disclosure described herein. The computer system 300 can be connected to a data storage device 302 via an input/output interface(s) 356. The data storage device 302 can include a program 304 embodied thereon. The program 304 is representative of one or more programs available to the computer system 300 which can include, for example, instructions for executing read/write commands. In another example, the program 304 may be read from the data storage device 302 into memory 310 using the I/O interface 356, for execution by one of the CPUs. The memory 310 can include a hierarchical cache memory and a main storage. In another example, an interruption may be caused by a generic I/O processor 350 executing instructions (for example, instructions to read or write data) wherein the asynchronous completion of the I/O operation results in an interruption 340, generically shown in FIG. 4. The interruption can be routed to one of a plurality of CPUs comprising, for example, a first or second CPU 330, 332. Computer system memory is generically represented by memory 310. Cache memory may include a data cache 118a and an instruction cache 116a for receiving TX instructions 320, as shown in the first CPU 330. The computer system 300 can include network interface(s) 354 and input/output (I/O) interface(s) 356, as shown in FIG. 4. The I/O interface(s) 356 allow for input and output of data with an external device 358 that may be connected to the computing device. The network interface(s) 354 may provide communications between the computing device and a computer network.

The first CPU 330 can execute instructions while operating in a transactional memory mode. To facilitate the transactional memory mode, instruction cache 116a is used to hold instructions that may or may not be part of a transaction. A data cache with transactional memory support 118a is also included. The transactional memory support includes the ability to monitor for protocol requests from the second CPU 332 over an interconnect. The first CPU 330 interfaces with the interconnect with an interconnect control 120a. The interconnect control provides the addresses of requested cache lines with protocol requests to the caches 116a and 118a as well as the non-cached monitor 336. Upon receiving the address of a protocol request from interconnect control 120a, the directory entries in data cache 118a are inspected to see if the address matches a line that was cached as part of transactional execution. If the address matches a line that was cached as part of transactional execution, then the data cache signals to the CPU to abort the transaction and leave transactional execution. Additionally, upon receiving the address of a protocol request from interconnect control 120a, the addresses in non-cache monitor 336 are inspected that have been fetched but not cached while the CPU 330 is in the transactional execution mode.

While in the transactional execution mode CPU 330 can execute instructions fetched from the instruction cache 116a. Some of the instructions executed may include cacheable memory references. These memory references are tracked by the data cache 118a and the associated data is stored in the cache. Some of the instructions executed may include non-cacheable memory references. In this case, the address of the data fetched is placed in the non-cached monitor 336.

Figure 5:
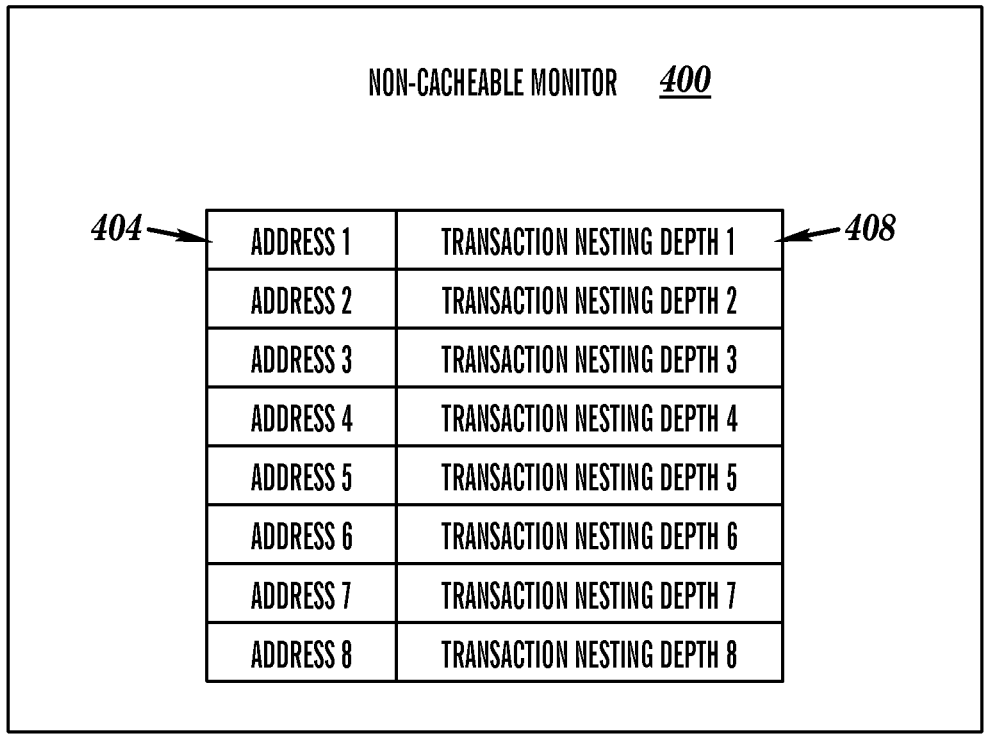
FIG. 5 is a table depicting a non-cacheable monitor according to an embodiment of the disclosure.

An embodiment of a non-cache monitor 400 is depicted in FIG. 5. In this embodiment, the non-cache monitor stores the address 404 of the cache line containing the data requested by the non-cacheable load instruction, and optionally the transaction nesting depth 408. When a protocol request comes in from another CPU during the execution of a transaction, the address of the protocol request is checked against the addresses in the non-cache monitor. The addresses can be stored in all of the same ways that addresses are stored in caches, either a single set, a set associative lookup, or a fully associative lookup. The array is indexed by some or all of the bits of the address of either a non-cacheable load instruction, or a protocol request. If an address 404 is found in the non-cache monitor, depending on the transactional memory implementation, either the outermost transaction is aborted, or the transaction running at the nesting depth specified in the non-cache monitor is aborted. When an abort occurs, all entries with a transaction nesting depth greater than nesting depth of the aborted TBEGIN are cleared from the monitor.

Referring to FIG. 6, an embodiment 500 according to the disclosure includes accepting a request by the processor to execute a transactional execution (TX) transaction (step 504).

In one embodiment, based on execution, by the processor, of a cacheable load or store instruction 320 for loading or storing first memory data 310 of the transaction, a cache miss operation is performed on the cache based on a cache line associated with the first memory data being not-cached in the cache 118*a* (step 508).

In one embodiment, a non-cacheable load instruction may be presented to the processor (step 509) for loading. If a non-cacheable load instruction is not presented to the processor, the transactional execution continues (step 522).

Based on execution (step 512) by the processor 330 of a non-cacheable load instruction for loading second memory data of the transaction, the cache miss operation on the cache based on a cache line associated with the second memory data being not-cached is not performed (step 516).

An address of the second memory data is loaded (step 518) into the non-cache-monitor 336, wherein the non-cache monitor is for monitoring memory conflicts of non-cached lines.

The embodiment determines if there is a memory conflict from another processor (step 520). If there is no memory conflict, the embodiment continues the transactional execution (step 522).

The embodiment aborts the TX transaction (step 524) based on the non-cache monitor 336 detecting a memory conflict from another processor, the memory conflict can comprise requesting an access, by another processor, to the address monitored by the non-cache monitor 336.

In another example, a non-cacheable load can be for an I/O (input/output) function. In one instance, the non-cacheable load instructions are not part of input/output (I/O) operations. In another example, a non-cacheable load can be a transient load.

In one embodiment, if another processor request a store of the address, the second processor can modify the second memory data, thereby, the TX processor cannot restore all data, including the first and second memory data, to their original state. The present disclosure preserves the atomicity of the TX operation, by monitoring addresses using monitor 336, and aborting the transaction for a memory conflict.

In one instance, the request from another processor, which causes aborting the TX transaction, can be to modify the first data in the cache.

Figure 7:
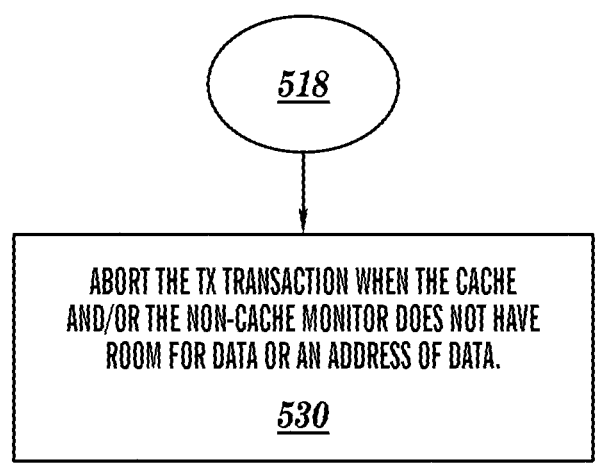
FIG. 7 is another flow chart depicting an embodiment from the flow chart shown in FIG. 6.

In another embodiment, based on execution (by the processor 330) of a cacheable load instruction for loading memory data of the transaction, and the cache 118*a* having no room for the memory data, the TX transaction is aborted. Also, the TX transaction is aborted based on execution, by the processor 330, of a non-cacheable load instruction for loading memory data of the transaction, and the monitor 336 having no room for an address of the data. Thereby, the TX transaction can be aborted when the cache 118*a* and/or the non-cache monitor 336 (FIG. 4) no longer have room for data or an address of data (step 530) (FIG. 7).

In one instance, the TX transaction can include a TX begin instruction and a TX end instruction defining the TX mode of the processor.

Cache Hierarchy

Figure 8:
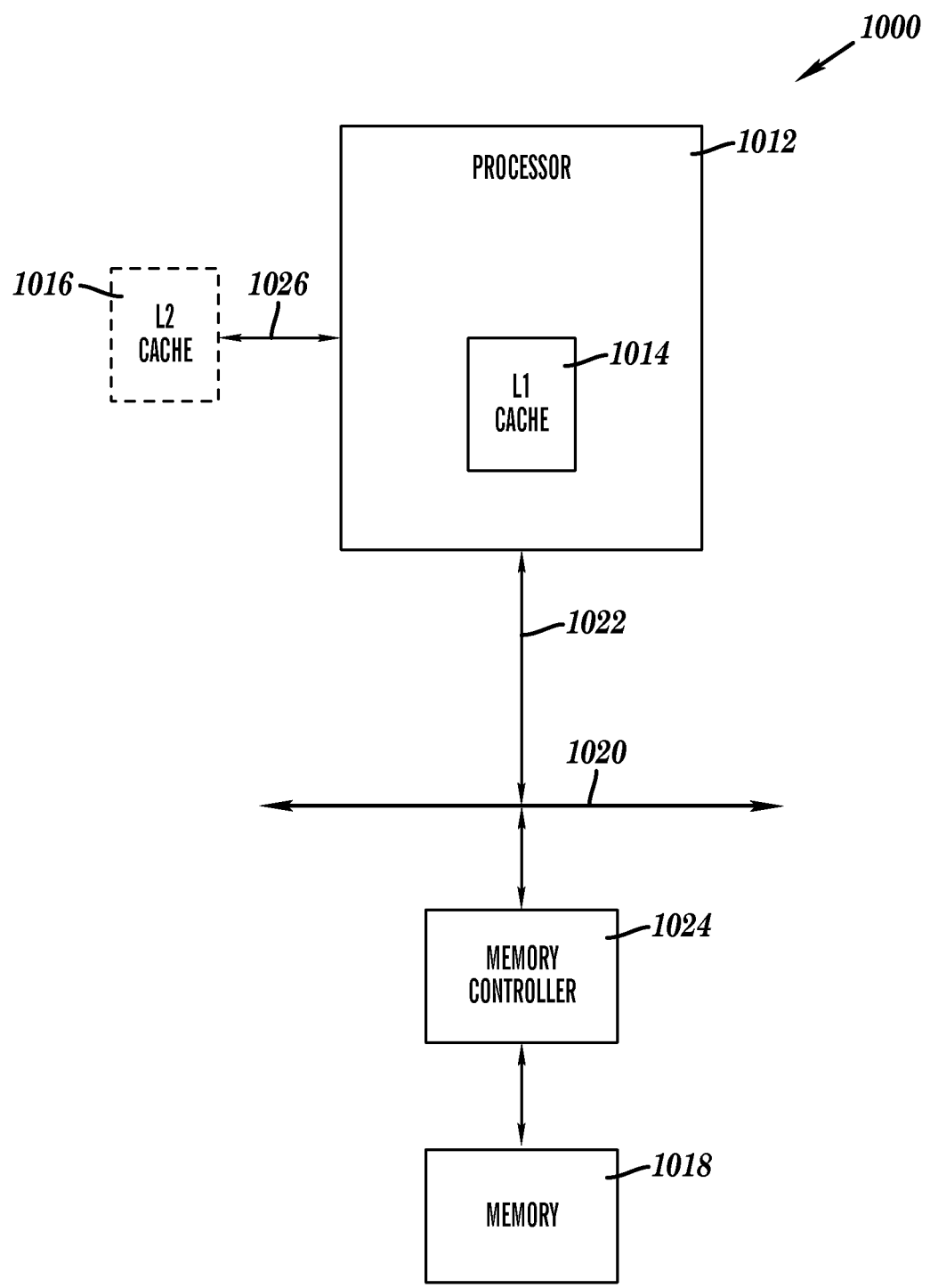
FIG. 8 is a schematic block diagram illustrating a data processing machine, according to an embodiment of the disclosure.

FIG. 8 depicts a pictorial representation of a data processing system 1000, which includes an illustrative write-back cache. As illustrated, data processing system 1000 includes processor 1012, on-board level one (L1) cache 1014, optional level two (L2) cache 1016, memory 1018, system bus 1020, processor bus 1022, and memory controller 1024.

Processor 1012 executes software instructions, which are stored in memory 1018 or are received by processor 1012 from another device coupled to system bus 1020. In order to avoid the latency incurred by repeated accesses to memory 1018, instructions and data retrieved from memory 1018 are stored within L1 cache 1014 or L2 cache 1016 (if present) due to the probability that the instructions and data will be requested again. Processor 1012 preferably comprises one of the SystemZ line of microprocessors available from IBMTM; however, those skilled in the art will recognize that processor 1012 could also be implemented utilizing an 80×86, PENTIUM (a trademark of Intel Corporation), or other suitable processor.

L1 cache 1014 comprises a small (e.g., 256 Kbyte) high-speed memory, which permits the registers and execution units within processor 1012 rapid access to data and instructions recently retrieved from memory 1018 via high-speed processor bus 1022 and system bus 1020. As described above, L1 cache 1014 is preferably configured as a write-back cache in order to maximize the performance of data processing system 1000 by reducing the bandwidth of system bus 1020 utilized to write back data to memory 1018. However, in one embodiment of L1 cache 1014, accesses to data contained within L1 cache 1014 can be configured by software as either write-through or write-back on a per cache line basis. Although illustrated as a unified cache, that is, a cache that stores both data and instructions, those skilled in the art will appreciate that L1 cache 1014 can alternatively be implemented as two distinct data and instruction caches.

As indicated by dashed line illustration, processor 1012 can be coupled to an optional L2 cache 1016. Like L1 cache 1014, L2 cache 1016 comprises a high-speed memory that contains a subset of the data and instructions stored within memory 1018. In order to maximize data access efficiency, L2 cache 1016 is preferably larger in size than L1 cache 1014 and is also configured as a write-back cache. Although illustrated as coupled to processor 1012 via a dedicated bus 1026, those skilled in the art will appreciate that L2 cache 1016 can alternatively be implemented on-board processor 1012, coupled to processor bus 1022 in an in-line or lookaside configuration, or coupled to system bus 1020.

In the depicted illustrative embodiment, memory 1018 comprises a random access memory (RAM) having an associated memory controller 1024. Memory controller 1024 generates read enable and write enable signals to facilitate storage and retrieval of data and includes address translation facilities that map logical addresses utilized by processor 1012 into physical addresses within memory 1018. As will be appreciated by those skilled in the art, memory 1018 can comprise a number of individual volatile memory modules which store data and segments of operating system and application software while power is supplied to data processing system 1000. Those skilled in the art will further appreciate that in addition to memory 1018, numerous types of devices can be coupled to system bus 1020 for interaction with processor 1012, L1 cache 1014, L2 cache 1016, and memory 1018; however, devices not necessary for an understanding of the illustrative embodiment described herein have been omitted for the sake of simplicity.

Figure 9:
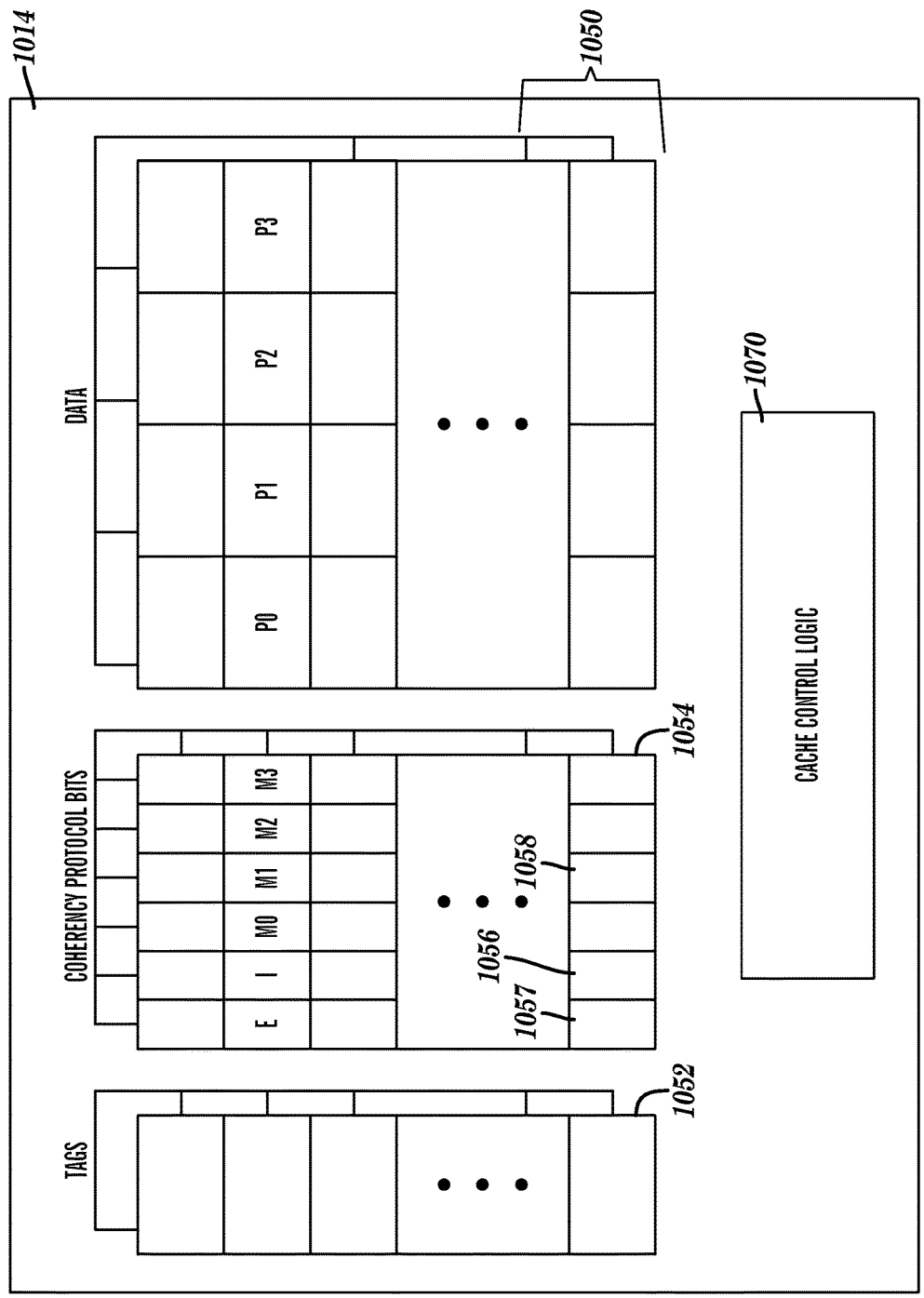
FIG. 9 is a schematic block diagram illustrating a write-back cache, according to an embodiment of the disclosure, in accordance with the illustrative embodiment of a data processing system depicted in FIG. 8.

Referring now to FIG. 9, there is illustrated a pictorial representation of a write-back cache in accordance with the illustrative embodiment of a data processing system depicted within FIG. 8. Although the write-back cache illustrated within FIG. 8 is identified as L1 cache 1014, it will be understood that the pictorial representation of a write-back cache depicted within FIG. 9 is equally applicable to L2 cache 1016. In the depicted illustrative embodiment, L1 cache 1014 is a two-way set associative cache comprising a number of cache lines 1050, which each include four bus packets P0-P3 in each of two ways. Each bus packet P0-P3 comprises one or more bytes of data and preferably has a packet size equal to the width of processor bus 1022 and system bus 1020. Thus, for example, if processor bus 1022 and system bus 1020 are 64-bit busses, each of bus packets P0-P3 preferably includes 8 bytes of data.

As with conventional caches, data is mapped into a particular cache line 1050 of L1 cache 1014 by an index portion of the memory address which stores the data. When stored within L1 cache 1014, data associated with a particular memory address is distinguished from data associated with other addresses having the same index portion by an address tag 1052, which preferably comprises the high-order bits of the physical address within memory 1018 at which the data is stored.

L1 cache 1014 further includes coherency protocol bits 1054, which in the depicted embodiment implement the MEI (Modified, Exclusive, Invalid) cache coherency protocol. Those skilled in the art will appreciate that other cache coherency protocols, for example, the MESI (Modified, Exclusive, Shared, Invalid) protocol, could alternatively be implemented within L1 cache 1014. Coherency protocol bits 1054 comprise one exclusive bit (E) 1057, one invalid bit (I) 1056, and four modified bits 1058 (labeled M0-M3) associated with each way of each cache line 1050. When set, the exclusive bit 1057 associated with a particular way of a cache line 1050 indicates that the data block stored within that way is contained within L1 cache 1014 only (not L2 cache 1016) and is consistent with memory 1018. The invalid bit 1056 associated with a particular way of a cache line 1050 is set to indicate that the data associated with the corresponding address tag 1052 is not resident within L1 cache 1014. For example, invalid bit 1056 is set when a snoop hit occurs during a cacheable read or write access to the same location within memory 1018 by a second bus master within data processing system 1000. Each of modified bits (M0-M3) 1058 is associated with a particular one of bus packets P0-P3 within the corresponding cache line way. Modified bits M0-M3 are set when the corresponding bus packet P0-P3 is modified with respect to memory 1018. Thus, setting one of modified bits M0-M3 indicates that data within the corresponding bus packet is valid only within L1 cache 1014 and must eventually be written back to memory 1018 to maintain coherency.

Finally, L1 cache 1014 includes cache control logic 1070. In addition to implementing a cache coherency protocol by setting and clearing coherency protocol bits 1054, cache control logic 1070 generates address tags from logical addresses and selects cache lines for replacement according to an LRU algorithm.

Figure 10:
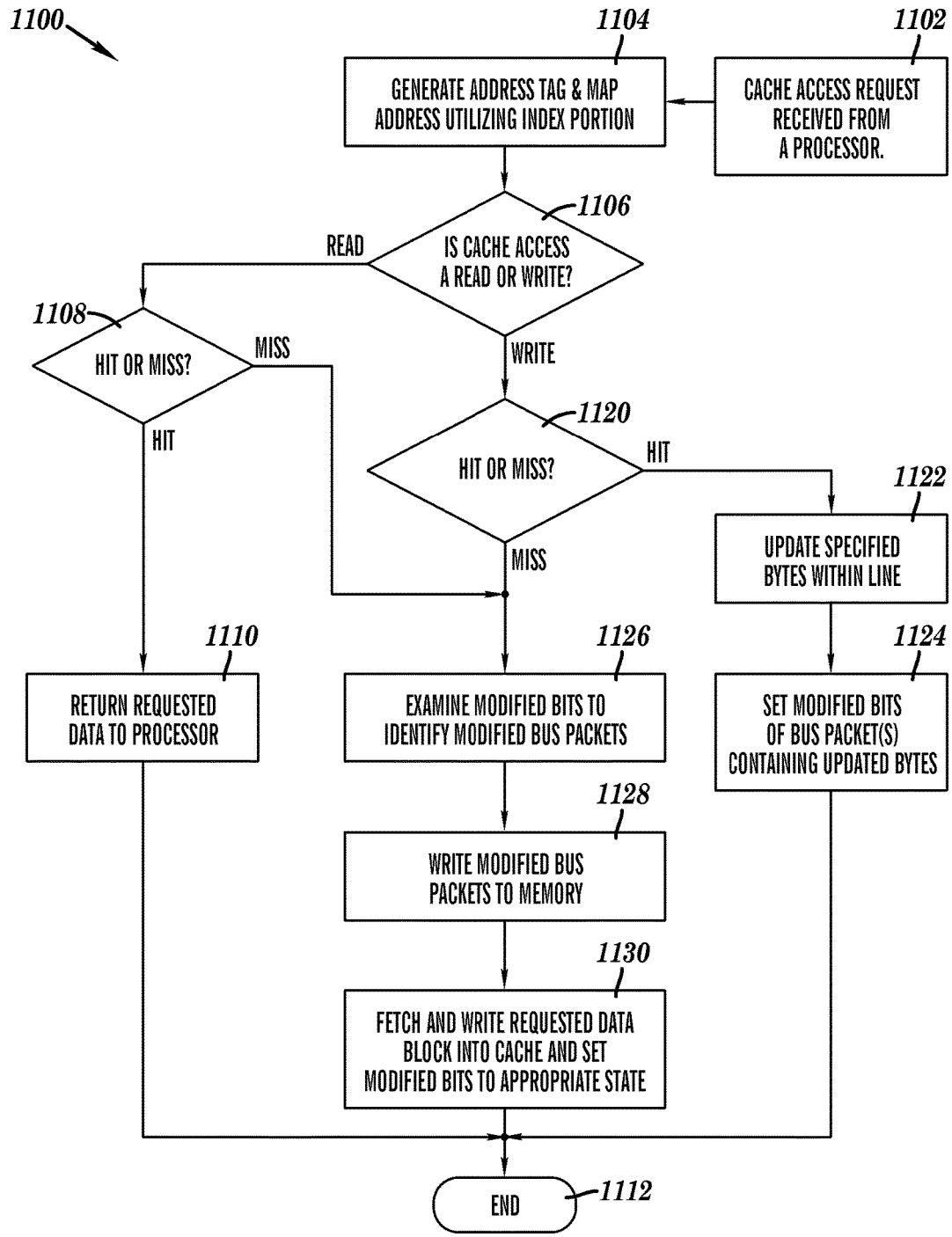
FIG. 10 is a flowchart illustrating a method to maintain cache coherency, according to an embodiment of the disclosure, within a data processing system shown in FIG. 8.

With reference now to FIG. 10, a method 1100 which can be utilized to maintain cache coherency within data processing system 1000 of FIG. 8 is shown. As illustrated, the process begins at block 1102 when a cache access request is received from a processor 1012 by L1 cache 1014. Block 1104 depicts cache control logic 1070 generating an address tag, that is, the high order bits of the physical address of the operand data, based upon the logical (effective) address of the operand data. In addition, cache control logic 1070 maps the cache access request to a specified cache line 1050 utilizing the index portion of the logical address.

Block 1106 illustrates a determination of whether or not the cache access request is a read request or a write request. In response to a determination that the cache access request is a read request, the process proceeds from block 1106 to block 1108.

Block 1108 depicts a determination of whether the read request results in a hit or miss. The determination illustrated at block 1108 can be made by comparing the address tag generated at block 1104 with the address tag 1052 associated with each way of the specified cache line 1050. If the generated address tag matches one of the address tags 1052 associated with a way of the specified cache line 1050, a cache hit occurs and the process proceeds to block 1110, which illustrates L1 cache 1014 returning the requested data to processor 1012. Thereafter, the process terminates at block 1112.

However, if the read request misses L1 cache 1014, the process passes to blocks 1126-1130, which as described below depict the replacement of one of the ways of the specified cache line 1050 to which the memory address of the requested data maps.

Returning to block 1106, if a determination is made that the cache access request is a write to the specified cache line 1050, the process proceeds from block 1106 to block 1120, which illustrates a determination of whether the write request results in a hit or a miss. The determination illustrated at block 1120 is made by comparing the address tag generated at block 1104 with the address tag 1052 associated with each way of the specified cache line 1050. If the generated address tag matches one of address tags 1052, a hit occurs and the process passes to blocks 1122 and 1124. Blocks 1122 and 1124 depict updating the appropriate bytes within the specified cache line 1050 and setting the modified bits 1058 associated with the bus packets containing the updated bytes. Thus, in order to reduce the bus utilization required for write-backs, L1 cache 1014 indicates the modification of cached data utilizing a smaller granularity than conventional write-back caches. The process then proceeds from block 1124 to block 1112, where the process terminates.

Referring again to block 1120, if a determination is made that the cache access request results in a miss, that is, the generated address tag does not match the address tag 1052 associated with either way of the specified cache line 1050, the process passes to blocks 1126-1130. As noted above, blocks 1126-1130 depict the write-back of a selected way of the specified cache line 1050. In the illustrated embodiment, the replaced ways are selected according to an LRU (Least Recently Used) algorithm that can be implemented by associating a single LRU bit with each of cache lines 1050; however, those skilled in the art will appreciate that other replacement schemes can also be employed.

Still referring to FIG. 10, block 1126 illustrates cache control logic 1070 examining the modified bits 1058 associated with the way selected for replacement within the specified cache line 1050 in order to identify which of bus packets P0-P3 (FIG. 9) have been modified. Next, the process proceeds to block 1128, which depicts writing only the bus packets marked as modified to memory 1018. In contrast to conventional write-back caches, bus packets which are not marked as modified are simply cast out and are not written back to memory 1018, thereby reducing the bus utilization required for a write-back. Next, the process proceeds to block 1130, which illustrates fetching a data block containing the requested data from L2 cache 1016 or memory 1018 and writing the data block into the selected way of the specified cache line 1050. In addition, the modified bits 1058 associated with the selected way are set or cleared to indicate which bus packets P0-P3 contain modified data. Thus, if the replacement of the selected way was performed in response to a read miss, all of the modified bits 1058 associated with the selected way are cleared; however, if the way was replaced due to a write miss, one or more modified bits 1058 are set to indicate which of bus packets P0-P3 contain modified data. Thereafter, the process passes to block 1112 and terminates.

Thereby, the present disclosure allows non-cacheable instructions that load data, but do not place the data into the cache to be within a hardware transaction. One advantage of the embodiment(s) of the present disclosure is that a transaction can be accepted by a TX processor which does not place all data into cache but monitors such data as it monitors cached data in a TX. The embodiment(s) of the present disclosure is able to buffer and monitor TX conflicts of data accesses of memory data not in cache, for example, using the non-cache monitor 336, in contrast to only tracking cached data of transactions, which does not provide the ability to track if another CPU stores to the memory locations that were read by the non-cacheable load.

Thus, in an embodiment of the present disclosure, an extra directory of read addresses can be kept that is also searched when a bus request in received indicating another write from another CPU along with the cache directories. One advantage of the present embodiment, is that it allows non-cacheable loads to be executed within a hardware transaction and does not require the extra chip area in the cache to store the data. In the embodiment(s) disclosed herein, when non-cacheable loads proceed through the memory system, the addresses of the cache lines that would have loaded into the cache are saved in a separate directory. When a protocol request comes in because another CPU wants to modify the cache line which was loaded and not cached, the transaction will abort. If the extra directory fills up, then the transaction can be aborted due to running out of resources, just as an abort due to the cache being full.

Referring to at least FIG. 4, the present invention may be a system, a method, and/or a computer program product 305. The computer program product may include a computer readable storage medium 302 (or media) having computer readable program instructions 304 thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present disclosure has been particularly shown and described with respect to preferred embodiments thereof, it will be understood by those skilled in the art that changes in forms and details may be made without departing from the spirit and scope of the present application. It is therefore intended that the present disclosure not be limited to the exact forms and details described and illustrated herein, but falls within the scope of the appended claims.

What is claimed is:

1. A computer program product for allowing non-cacheable loads in a hardware transactional memory environment, wherein transactional loads or stores by a processor are monitored for transactional execution (TX) conflicts in a cache of a hierarchical cache subsystem, the computer program product comprising:
a computer readable storage medium readable by a processing circuit and storing instructions for execution by the processing circuit for performing a method comprising:
accepting a request, by the processor, to execute a transactional execution (TX) transaction;
based on execution, by the processor, of a cacheable load instruction, loading first memory data for the TX transaction based on a cache line associated with the first memory data;
based on execution, by the processor, of a non-cacheable load instruction for loading second memory data of the TX transaction, loading an address of the second memory data into a non-cache monitor for monitoring memory conflicts of non-cached lines in response to the processor loading the second memory data for execution by the processor;
avoiding memory conflicts by both the cacheable loads of the first memory data, and the non-cache memory of the second memory data;
implementing a cache coherency protocol for coherency between cacheable loads of the first memory data by setting and clearing coherency protocol bits, and enforcing the cache coherency protocol using cache control logic;
monitoring an address of the cache line associated with the first memory data using the cache control logic;
aborting the TX transaction in response to a memory conflict including an address matching the address of the cache line that was cached as part of the TX transaction;
monitoring the address of the second memory data by the non-cache monitor; and
aborting the TX transaction based on the non-cache monitor detecting a memory conflict from another processor of the second memory data, the memory conflict comprising requesting an access, by the other processor, to the address monitored by the non-cache monitor which includes the non-cached lines stored in the non-cache memory device while the processor is executing the non-cacheable load instruction.

2. The computer program product claim 1, the method comprising:
based on execution, by the processor, of the cacheable load or store instruction for loading or storing memory data of the transaction and the cache having no room for the first memory data, aborting the TX transaction; and
based on execution, by the processor, of the non-cacheable load instruction for loading the second memory data of the transaction and the non-cache monitor having no room for an address of the second memory data, aborting the TX transaction.

3. The computer program product of claim 1, wherein the TX transaction includes a TX begin instruction and a TX end instruction defining a TX mode of the processor.

4. The computer program product of claim 1, wherein an abort of the TX transaction is based on a conflict detected in the cache from the cacheable load.

5. The computer program product of claim 1, wherein the memory access of the cacheable and non-cacheable load instructions is random.

6. The computer program product of claim 1, wherein the non-cache memory device includes random access memory (RAM).

7. The computer program product of claim 1, wherein the non-cacheable load is part of an I/O (input/output) function.

8. A computer system for allowing non-cacheable loads in a hardware transactional memory environment, the computer system comprising:

a memory; and a processor in communications with the memory by way of a hierarchical cache subsystem, wherein transactional loads or stores by the processor are monitored for transactional execution (TX) conflicts in a cache of the hierarchical cache subsystem, wherein the computer system is configured to perform a method, said method comprising:

accepting a request, by the processor, to execute a TX transaction;

based on execution, by the processor, of a cacheable load instruction, loading first memory data for the TX transaction based on a cache line associated with the first memory data;

based on execution, by the processor, of a non-cacheable load instruction for loading second memory data of the TX transaction, loading an address of the second memory data into a non-cache monitor for monitoring memory conflicts of non-cached lines in response to the processor loading the second memory data for execution by the processor;

avoiding memory conflicts by both the cacheable loads of the first memory data, and the non-cache memory of the second memory data;

implementing a cache coherency protocol for coherency between cacheable loads of the first memory data by setting and clearing coherency protocol bits, and enforcing the cache coherency protocol using cache control logic;

monitoring an address of the cache line associated with the first memory data using the cache control logic;

aborting the TX transaction in response to a memory conflict including an address matching the address of the cache line that was cached as part of the TX transaction;

monitoring the address of the second memory data by the non-cache monitor; and aborting the TX transaction based on the non-cache monitor detecting a memory conflict from another processor of the second memory, the memory conflict comprising requesting an access, by the other processor, to the address monitored by the non-cache monitor which includes the non-cached lines stored in the non-cache memory device while the processor is executing the non-cacheable load instruction.

9. The computer system of claim 8, the method further comprising:

based on execution, by the processor, of the cacheable load or store instruction for loading or storing memory data of the transaction and the cache having no room for the first memory data, aborting the TX transaction; and based on execution, by the processor, of the non-cacheable load instruction for loading the second memory data of the transaction and the non-cache monitor having no room for an address of the second memory data, aborting the TX transaction.

10. The computer system of claim 8, wherein the TX transaction includes a TX begin instruction and a TX end instruction defining a TX mode of the processor.

11. The computer system of claim 8, wherein an abort of the TX transaction is based on a conflict detected in the cache from the cacheable load.

12. The computer system of claim 8, wherein the non-cache memory device includes random access memory (RAM).

13. The computer system of claim 8, wherein the memory access of the cacheable and non-cacheable load instructions is random.

14. The computer system of claim 8, wherein the non-cacheable load is part of an I/O (input/output) function.

* * * * *